US010855725B2

(12) United States Patent
Pai et al.

(10) Patent No.: US 10,855,725 B2
(45) Date of Patent: Dec. 1, 2020

(54) HARDWARE-BASED VIRTUALIZED SECURITY ISOLATION

(71) Applicant: Microsoft Technology Licensing, LLC, Redmond, WA (US)

(72) Inventors: Navin Narayan Pai, Seattle, WA (US); Charles G. Jeffries, Sammamish, WA (US); Giridhar Viswanathan, Redmond, WA (US); Benjamin M. Schultz, Bellevue, WA (US); Frederick J. Smith, Remond, WA (US); Lars Reuther, Kirkland, WA (US); Michael B. Ebersol, Woodinville, WA (US); Gerardo Diaz Cuellar, Kirkland, WA (US); Ivan Dimitrov Pashov, Woodinville, WA (US); Poornananda R. Gaddehosur, Redmond, WA (US); Hari R. Pulapaka, Redmond, WA (US); Vikram Mangalore Rao, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 174 days.

(21) Appl. No.: 15/171,917

(22) Filed: Jun. 2, 2016

(65) Prior Publication Data

US 2017/0353496 A1 Dec. 7, 2017

(51) Int. Cl.
*H04L 29/06* (2006.01)
*G06F 21/53* (2013.01)
(Continued)

(52) U.S. Cl.
CPC .............. *H04L 63/20* (2013.01); *G06F 21/53* (2013.01); *H04L 12/4641* (2013.01);
(Continued)

(58) Field of Classification Search
CPC ......... H04L 63/08; H04L 63/10; H04L 63/20; H04L 63/1416; H04L 63/1433; H04L 63/1441; H04L 12/14641; H04L 67/02
(Continued)

(56) References Cited

U.S. PATENT DOCUMENTS 8,151,337 B2 4/2012 Crowell et al.
8,769,268 B2 7/2014 Morozov et al.
(Continued)

FOREIGN PATENT DOCUMENTS

| CO | 6950443 A2 | 5/2014 |
|----|------------|--------|
| RU | 2460133 C1 | 8/2012 |
| WO | 2014094653 A1 | 6/2014 |

OTHER PUBLICATIONS

Reis,"Isolating Web Programs in Modern Browser Architectures", EuroSys '09—Available at <http://www.cs.washington.edu/homes/creis/publications/eurosys-2009.pdf>, Available at <http://www.cs.washington.edu/homes/creis/publications/eurosys-2009.pdf>, Apr. 2009, 13 Pages.

(Continued)

*Primary Examiner* — Ashokkumar B Patel
*Assistant Examiner* — William B Jones
(74) *Attorney, Agent, or Firm* — Fiala & Weaver P.L.L.C.

(57) ABSTRACT

A host operating system running on a computing device monitors network communications for the computing device to identify network resources that are requested by the computing device. The host operating system compares requested network resources against security policies to determine if the requested network resources are trusted. When an untrusted network resource is identified, the host operating system accesses the untrusted network resource within a container that is isolated from the host operating system kernel using techniques discussed herein. By restrict- (Continued)

ing access to untrusted network resources to isolated containers, the host operating system is protected from even kernel-level attacks or infections that may result from an untrusted network resource.

27 Claims, 7 Drawing Sheets

(51) Int. Cl.
  *H04L 12/46* (2006.01)
  *H04L 29/08* (2006.01)
(52) U.S. Cl.
  CPC .............. *H04L 63/08* (2013.01); *H04L 63/10* (2013.01); *H04L 63/1416* (2013.01); *H04L 63/1433* (2013.01); *H04L 63/1441* (2013.01); *H04L 67/02* (2013.01)
(58) Field of Classification Search
  USPC .......................................................... 726/1
  See application file for complete search history.

(56) References Cited

U.S. PATENT DOCUMENTS

| | | | |
|---|---|---|---|
| 8,776,169 | B2 | 7/2014 | Rajagopal et al. |
| 8,839,245 | B1 | 9/2014 | Khajuria et al. |
| 9,087,191 | B2 | 7/2015 | Deasy et al. |
| 9,098,698 | B2 | 8/2015 | Ghosh et al. |
| 9,104,837 | B1 | 8/2015 | Khajuria et al. |
| 9,116,733 | B2 | 8/2015 | Banga et al. |
| 9,245,108 | B1 | 1/2016 | Khajuria et al. |
| 9,246,690 | B1 | 1/2016 | Roth et al. |
| 10,635,509 | B2* | 4/2020 | Cho ........................ G06F 9/543 |
| 2005/0172279 | A1* | 8/2005 | Cook ........................ G06F 8/61 |
| | | | 717/162 |
| 2007/0143829 | A1* | 6/2007 | Hinton ................ H04L 63/0815 |
| | | | 726/5 |
| 2007/0156659 | A1 | 7/2007 | Lim |
| 2008/0059474 | A1* | 3/2008 | Lim ........................ G06F 16/93 |
| 2010/0328064 | A1* | 12/2010 | Rogel ..................... G06F 21/56 |
| | | | 340/540 |
| 2011/0047613 | A1 | 2/2011 | Walsh |
| 2014/0006347 | A1 | 1/2014 | Qureshi et al. |
| 2014/0047535 | A1 | 2/2014 | Parla et al. |
| 2014/0082621 | A1* | 3/2014 | Fitzgerald ........... G06F 9/45558 |
| | | | 718/1 |
| 2014/0101757 | A1* | 4/2014 | Gnesda ................. G06F 21/562 |
| | | | 726/22 |
| 2014/0115646 | A1* | 4/2014 | Rajgopal ............ H04N 21/4622 |
| | | | 725/110 |
| 2014/0349611 | A1 | 11/2014 | Kant et al. |
| 2015/0143374 | A1* | 5/2015 | Banga ................... G06F 9/5077 |
| | | | 718/1 |
| 2015/0150142 | A1 | 5/2015 | Austin et al. |
| 2015/0379287 | A1* | 12/2015 | Mathur ............... G06F 21/6209 |
| | | | 726/27 |
| 2016/0029340 | A1* | 1/2016 | Woodcock, IV ... H04W 64/003 |
| | | | 455/456.2 |

OTHER PUBLICATIONS

Saini,"sandFOX: Secure Sandboxed and Isolated Environment for Firefox Browser", n Proceedings of the 8th International Conference on Security of Information and Networks, Sep. 8, 2015, 8 pages.
"International Search Report and Written Opinion", Application No. PCT/US2017/034354, dated Aug. 30, 2017, 13 pages.
"Office Action and Search Report Issued in Chile Patent Application No. 03297-2018", dated Aug. 20, 2019, 12 Pages.
"Office Action and Search Report Issued in Chile Patent Application No. 03297-2018", dated Jan. 9, 2020, 10 Pages.
"Office Action Issued in Colombian Patent Application No. NC2018/0012982", dated Jan. 22, 2020, 17 Pages.
"Office Action Issued in Russian Patent Application No. 2018142303", dated Jul. 24, 2020, 15 Pages.

* cited by examiner

300

```
┌─────────────────────────────┐
│ Detect Attempted Access To A│
│      Network Resource       │
│             302             │
└─────────────────────────────┘
                │
                ▼
        ◇ Is Network Resource Trusted? 304 ◇ ──Yes──┐
                │                                    │
                No                                   │
                │                                    │
                ▼                                    │
        ◇ Is HVSI Enabled On Host Operating System? 306 ◇ ──No──┤
                │                                    │
                Yes                                  │
                ▼                                    │
        ┌──────────────────┐                         │
        │ Activate Container│                        │
        │       308        │                         │
        └──────────────────┘                         │
                │                                    │
                ▼                                    ▼
┌──────────────────────────┐   ┌────────────────────────────────┐
│ Allow The Container To   │   │ Allow Application On Host      │
│ Access The Network       │   │ Operating System To Access     │
│ Resource 310             │   │ The Network Resource 312       │
└──────────────────────────┘   └────────────────────────────────┘
```

Fig. 3

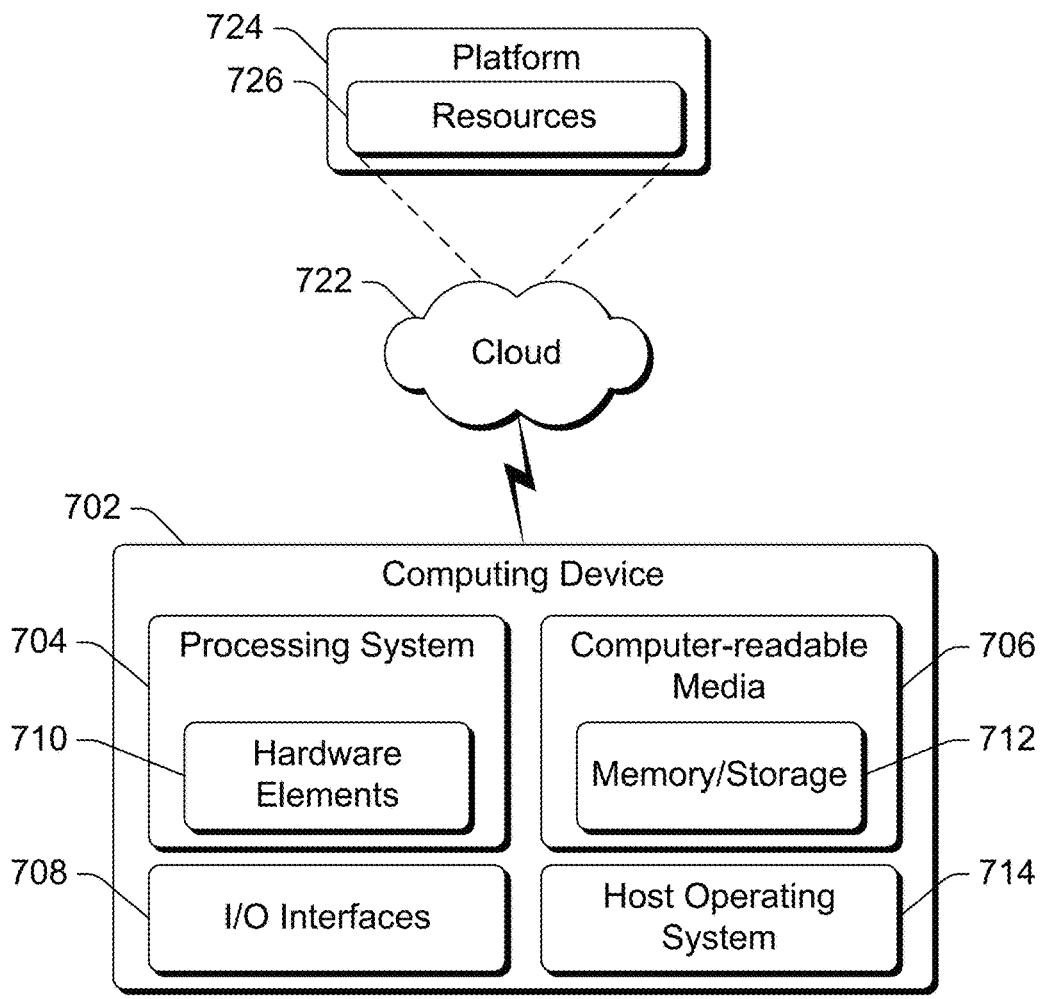
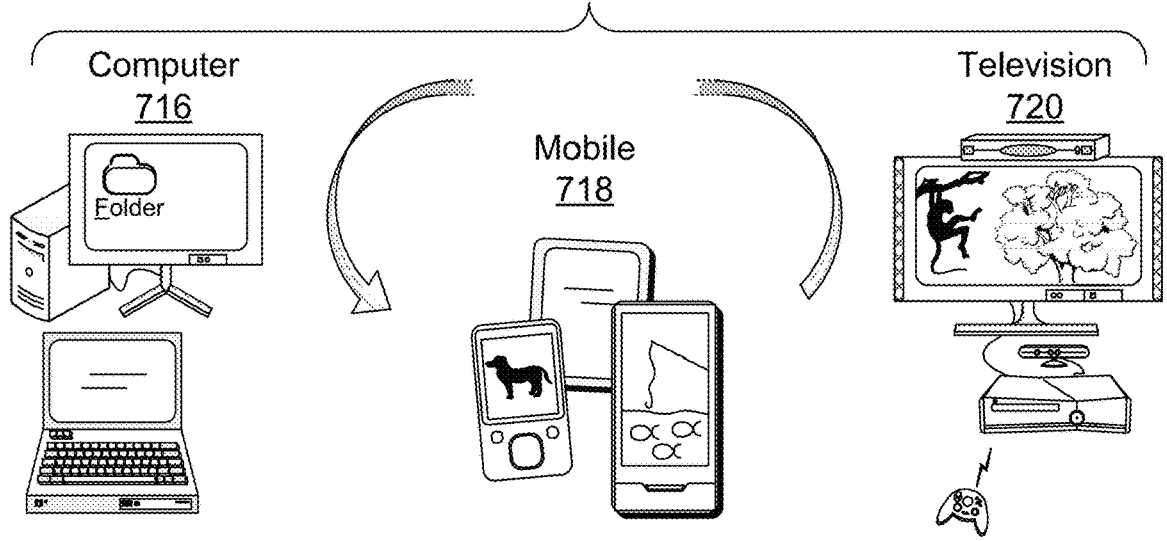
Fig. 7

HARDWARE-BASED VIRTUALIZED SECURITY ISOLATION

BACKGROUND

Computing device infections often occur when users browse the Internet to untrusted web sites or when they download or open untrusted network resources such as applications and documents. These infections allow attackers to steal the user's credentials or even take control of the computing device to repurpose it for the attacker's own means. While one solution to combat these kernel level attacks is to shut down network access to the computing device, this severely limits the functionality of many modern computing devices. Additionally, in a workplace environment, disabling network access hampers employee productivity and job satisfaction. As a compromise, many employers enable limited network access by preventing employees from accessing untrusted network resources. However, this limited network access results in increased administration costs for the employer as the employer must consistently update policy defining which network resources are untrusted. This can lead to frustration with the use of computing devices by both the users and the employer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application is run in a host operating system. In response to detecting that the application is attempting to access a network resource, the host operating system determines whether the network resource is a trusted network resource or an untrusted network resource. In response to determining that the network resource is an untrusted network resource, the host operating system activates a container that is isolated from the host operating system and is configured to run a version of the application within the container. The host operating system then allows the version of the application running in the container to access the untrusted network resource.

In accordance with one or more aspects, startup of a host operating system is detected. In response to detecting startup of the host operating system, it is determined if the host operating system includes a container base image. As discussed herein, a container base image refers to a proximate copy of the host operating system's version, patch level, and configuration. In response to determining that the host operating system does not include a container base image, a container base image is created. After creating the container base image, a user login to the host operating system is detected. In response to detecting the user login to the host operating system, a container corresponding to the container base image is activated and the activated container is suspended. In response to detecting access to an untrusted network resource, the suspended container is resumed and the resumed container is allowed to access the untrusted network resource.

In accordance with one or more aspects, a web application is run on a host operating system of a device. As discussed herein, a web application is configured to access one or more network resources stored remotely from the device running the host operating system. In response to detecting that the web application is accessing a network resource, the network resource is determined to be an untrusted resource by comparing the network resource to a policy received from a management and monitoring service that is located remotely from the device. In response to determining that the network resource is an untrusted network resource, the host operating system activates a container that is configured to run a version of the web application and that is isolated from the host operating system. After the container is activated, the host operating system allows the version of the web application running in the container to access the untrusted network resource. The host operating system allows the version of the web application running in the container to access additional untrusted network resources and prevents the version of the web application running in the container from accessing trusted network resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 is a flowchart illustrating an example process for implementing hardware-based virtualized security isolation in accordance with one or more embodiments.

FIG. 7 illustrates an example system that includes an example computing device that is representative of one or more systems and/or devices that may implement the various techniques described herein.

DETAILED DESCRIPTION

Figure 1:
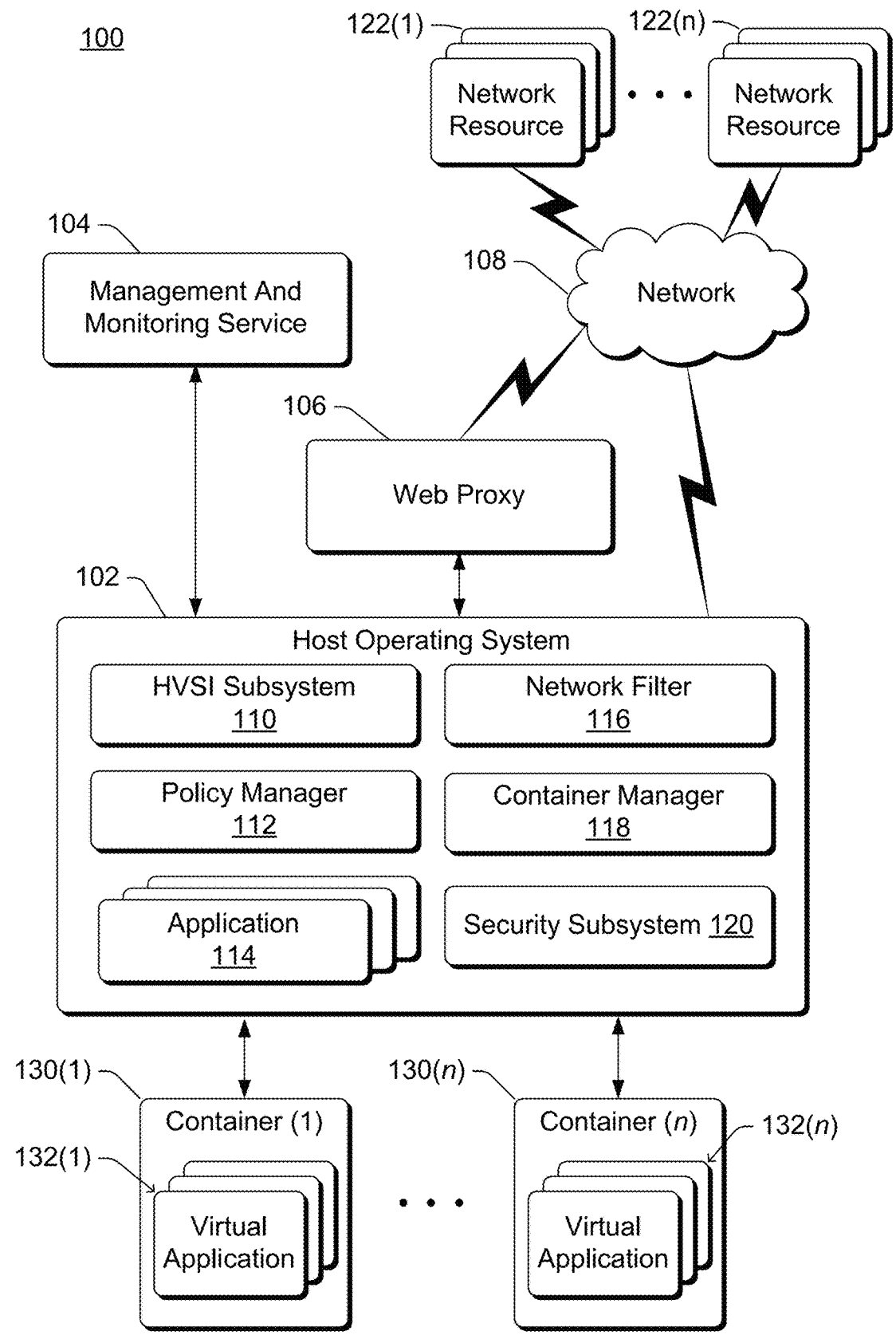
FIG. 1 illustrates an example system implementing hardware-based virtualized security isolation in accordance with one or more embodiments.

Hardware-based virtualized security isolation is discussed herein. An operating system running on a computing device, also referred to herein as a host operating system running on a host device, uses containers for hardware resource partitioning. In contrast to many virtual machine-based or sandbox approaches, using containers in conjunction with the hardware-based virtualized security isolation techniques described herein protects the computing device from attacks by isolating web browsers, related applications, and operating system components such as the kernel, the file system, and the network from untrusted network resources. Isolation of untrusted network resources is enforced and monitored through one or more operating system filters and policy managers. In this manner, when the host device requests access to an untrusted network resource, the host device contains the untrusted network resource within one or more containers that provide full kernel isolation from the host operating system. As discussed herein, network resources refer to locations (e.g., of devices or where data resides) that the host device can access via a network, as well as one or more of data, executables, or network connections provided by one or more of the locations. For example, network resources can be files, applications, emails, documents, Uniform Resource Locators (URLs), Internet Protocol (IP) addresses, Transmission Control Protocol (TCP) ports, Domain Name System (DNS) name, data stores, hardware devices, or combinations thereof. A trusted network resource refers to a network resource that is trusted to not have malware or be used by malicious users, and is identified by one or more policies for the host device. An untrusted network resource refers to a network resource that is not trusted (e.g., that may have malware or be used by malicious users).

In order to protect the host device from malicious attacks, policy is used to define an enumerated list of trusted network resources. In an enterprise environment where multiple users of the enterprise are connected and share access to common enterprise data and/or networks, this policy may be defined by an administrator of the enterprise to ensure that individual users as well as the shared data and networks of the enterprise remain protected. When a user of the host device requests access to a network resource, the requested network resource is compared against the policy to determine if the requested network resource is a trusted network resource. If the policy indicates that the requested network resource is a trusted network resource, the hardware-based virtualized security isolation techniques described herein permit the trusted network resource to be accessed by the host operating system. The policy may be further leveraged to isolate network interfaces of a computing device implementing the virtualized security isolation techniques described herein by restricting access to one or more network communications of the host device for untrusted network resources. For example, if a host device supports wireless local area network (WLAN) communications, mobile broadband communications, dial-up connections, virtual private network (VPN) connections, and direct connections such as serial cabling, direct cabling, or an infrared link, network communications pertaining to untrusted network resources may be restricted to WLAN communications.

When a requested network resource is not defined by policy as a trusted network resource, the requested network resource is determined to be untrusted. In response to determining that a network resource is untrusted, the hardware-based virtualized security isolation techniques described herein activate a container that is isolated from the host operating system. The untrusted network resource is then accessed from the container so as to isolate any dangerous activity associated with the untrusted network resource. Because of the isolation, any malicious content or attacks that result from the untrusted network resource will be unable to break out of the container to infect the host operating system. The hardware-based virtualized security isolation techniques described herein are further configured to monitor activity within a container to ensure that the container does not gain access to any trusted network resource.

Accordingly, by activating containers to access untrusted network resources, the hardware-based virtualized security isolation techniques described herein create two or more separate instances of an operating system or contained runtime environment, each with network connectivity. By monitoring data and operations performed within these contained runtime environments, the hardware-based virtualized security isolation techniques described herein are configured to prevent any untrusted network resources from being accessed by the host operating system. The hardware-based virtualized security isolation techniques described herein additionally enable a host system to scan and share DNS and Hypertext Transfer Protocol (HTTP) information from the secure host operating system to improve web browsing performance or other network activity within the one or more of the isolated containers.

The hardware-based virtualized security isolation techniques described herein additionally allow a host operating system to download and access files in isolation, such as in one or more containers that are separate from the host operating system's kernel. This allows the host operating system to scan individual network resources such as files, applications, web sites, and so on to determine a risk level associated with individual ones of the scanned network resource.

The hardware-based virtualized security isolation techniques discussed herein are also configured to conserve system resources of the host device. For example, when one or more untrusted network resources within a container are inactive, the container can still exert pressure on system resources (e.g., memory) and affect the performance of any other containers or processes running on the host device that are competing for these resources. Accordingly, by monitoring activity within individual containers, the hardware-based virtualized security isolation techniques described herein are configured to suspend, or reset, individual containers to reduce the pressure the container exerts on host device resources when untrusted network resources within the container are inactive. The state of any one or more network resources within a suspended container may be preserved so that a user may quickly return to interact with the one or more untrusted network resources within the suspended container.

In response to a triggered event, such as when a user of the host device logs off, the hardware-based virtualized security isolation techniques described herein discard the container and all data associated with it. In this manner, containers may be corrupted by one or more untrusted network resources without any negative repercussions for the operating system of the host device.

Hardware-Based Virtualized Security Isolation System

FIG. 1 illustrates an example system 100 implementing hardware-based virtualized security isolation in accordance with one or more embodiments. System 100 is implemented at least in part by a host device. Any of a variety of different types of computing devices can be used to implement the system 100, such as a server computer, a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality glasses or headset, augmented reality headset or glasses), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth. Thus, the computing device implementing system 100 may range from a full resource device with substantial memory and processor resources (e.g., personal computers, game consoles) to a low-resource device with limited memory and/or processing resources (e.g., traditional set-top boxes, hand-held game consoles).

The system 100 includes a host operating system 102, a management and monitoring service 104, and a web proxy 106. The management and monitoring service 104 is representative of a service that provides one or more administrative policies for the computing device implementing the host operating system 102, as discussed herein. The web proxy 106 is representative of functionality that controls access to one or more network resources 122(1), . . . , 122(m) accessed remotely from the computing device implementing the host operating system 102. For example, in one or more embodiments web proxy 106 controls access to one or more resources accessed from network 108 by requiring authentication from host operating system 102, as discussed in further detail below. Alternatively, in one or more embodiments the computing device implementing host operating system 102 accesses network resources via network 108 independent of a web proxy. Network 108 represents functionality of a data network, such as the Internet, a local area network (LAN), a public telephone network, an intranet, other public and/or proprietary networks, combinations thereof, and so forth. As such, network resources 122(1), . . . , 122(m) accessed via network 108 may include web sites, web applications, emails, documents, and so on.

In one or more embodiments, the host operating system 102, management and monitoring service 104, and web proxy 106 are implemented as part of the same computing device. Alternatively, at least part of the management and monitoring service 104 and/or web proxy 106 can be implemented on a device that is separate and remote from the device implementing the host operating system 102. For example, in one or more embodiments the management and monitoring service 104 is implemented as a mobile device management (MDM) service located remotely from a computing device implementing host operating system 102. Alternatively or additionally, the management and monitoring service 104 may be implemented as a lightweight directory access protocol (LDAP) server located remotely from a computing device implementing host operating system 102. Similarly, the web proxy 106 may be implemented remotely from the device implementing the host operating system 102.

The management and monitoring service 104 is configured to provide (e.g., push) policy to the host operating system 102. In one or more embodiments, the management and monitoring service 104 is configured to push policy to the host operating system 102 at regular intervals, such as at system startup, daily, and so on. Alternatively, the management and monitoring service 104 may be configured to push policy to the host operating system 102 whenever there is an update to policy for the host operating system. Although reference is made herein to policy being pushed to the host operating system 102, management and monitoring service 104 is configured to provide policy to host operating system via any suitable data transmission methods (e.g., streaming). Alternatively, in one or more embodiments host operating system 102 is configured to obtain (e.g., pull) policy from the management and monitoring service 104. The management and monitoring service 104 has two roles. First, the management and monitoring service 104 receives an administrative configuration for individual network resources 122 (1), . . . , 122(m) that are generally accessible to a user of the host operating system 102. In one or more embodiments, these network resources are associated with individual levels of trust. For example, an employer may define any network resource that is associated with the employer's website as having a high level of trust. Accordingly, policy for the host operating system 102 indicates that any network resources associated with the employer's website are trusted network resources. The second role of the management and monitoring service 104 is to receive feedback from the host operating system 102 regarding monitored activity associated with individual network resources and to compile that monitored information into a report for an administrator. This compiled report may be used by an administrator to update policy pertaining to trusted network resources for the host operating system 102.

The management and monitoring service 104 may be configured to receive policy configuration data from an administrator of the device that implements the host operating system 102. As discussed herein, policy describes information pertaining to trusted network resources such as trusted websites, trusted network locations, trusted networks, and so on. When the management and monitoring service 104 receives policy from an administrator, the management and monitoring service 104 is configured to send a policy update to a target set of computing devices. The target set of computing devices to which the management and monitoring service 104 sends policy updates is defined by an administrator in accordance with one or more embodiments. For example, in an enterprise environment as discussed above, the management and monitoring service 104 is configured to send policy updates to each computing device associated with the enterprise. Each computing device that receives a policy update is configured to locally store the policy for use when attempting to access network resources.

As discussed in further detail below, the computing device that implements host operating system 102 is configured to dynamically monitor activity associated with accessed network resources 122(1), . . . , 122(m). Monitored activity associated with network resources is updated locally at the host operating system 102 and communicated back to the management and monitoring service 104. In this manner, the management and monitoring service 104 may be continuously updated to provide a user of the host operating system 102 with an accurate list of trusted network resources.

The host operating system 102 also includes a hardware-based virtualized security isolation (HVSI) subsystem 110, a policy manager 112, one or more applications 114, a network filter 116, a container manager 118, and a security subsystem 120. The host operating system 102 also manages one or more containers, illustrated as multiple (n) containers 130(1), . . . , 130(n).

HVSI subsystem 110 is representative of functionality for calling network isolation query application programming interfaces (APIs) to determine if a requested network resource is trusted. These network isolation query APIs are exposed by, for example, the policy manager 112. If HVSI subsystem 110 determines that a requested network resource is trusted, HVSI subsystem 110 allows the requested network resource to be accessed by the host operating system 102. Alternatively, if HVSI subsystem 110 determines that a requested network resource is not trusted, HVSI subsystem 110 causes the host operating system 102 to activate one or more of containers 130(1), . . . , 130(n) and allow the one or more activated containers to access the untrusted network resource. Functionality of the HVSI subsystem 110 will be discussed in further detail below. In accordance with one or more embodiments, HVSI subsystem 110 determines whether a requested network resource is trusted by communicating with policy manager 112.

The policy manager 112 is representative of functionality for obtaining and storing one or more policies for the computing device implementing the host operating system 102. For example, in one or more embodiments a policy manager 112 obtains and stores one or more administrative policies that define one or more trusted network resources for the host operating system 102. In accordance with one or more implementations, a policy manager 112 obtains and stores administrative policies from the management and monitoring service 104. Alternatively or additionally, policy manager 112 obtains and stores one or more administrative policies from a remote source, such as from network 108. Additionally or alternatively, policy manager 112 receives and stores one or more administrative policies from a user of the device implementing host operating system 102.

Applications 114 include one or more applications that are executable by one or more processors of the computing device implementing the host operating system 102. For example, applications 114 may include a web browser application. Alternatively or additionally, applications 114 may include applications such as e-mail applications, word processing applications, spreadsheet applications, visual presentation applications, and the like.

The network filter 116 is representative of functionality for connecting the device implementing host operating system 102 to a network, such as network 108. Network filter 116 includes at least one physical network interface card and at least one host virtual network interface card. Network filter 116 additionally includes a filter driver, which is configured to intercept requested network resources as they are transmitted from the network 108 to the host operating system 102. These intercepted network resources are then compared by the HVSI subsystem 110 against one or more policies stored in policy manager 112. In this manner, network filter 116 ensures that the host operating system 102 is prevented from accessing any untrusted network resources. Similarly, network filter 116 ensures that one or more of containers 130(1), . . . , 130(n) are unable to access any trusted network resources. For example, in one or more embodiments network filter 116 is configured to change data associated with individual packets of a trusted network resource to ensure that the trusted network resource is accessed only by the host operating system 102 and is prevented from being accessed by any of the one or more of containers 130(1), . . . , 130(n).

The host operating system 102 additionally includes a container manager 118. The container manager 118 manages the scheduling of containers 130(1), . . . , 130(n) in the system 100 and determines which containers 130(1), . . . , 130(n) are run on the host operating system 102 at what times. Container manager 118 is also responsible for activating one or more containers 130(1), . . . , 130(n) for an individual user of the system 100 and for ensuring that other users of the system 100 cannot access the one or more containers 130(1), . . . , 130(n) created for the individual user. Container manager 118 is also configured to collect logs and traces from any one or more created containers 130(1), . . . , 130(n) for telemetry and security indicators. For example, in one or more embodiments, container manager 118 consults anti-virus applications installed on the host operating system 102 to interpret collected information and provides monitored data to the HVSI subsystem 110. Depending on the number of physical processors and/or processor cores in the computing device running the host operating system 102, a single container 130(1), . . . , 130(n) can be run at a time (e.g., in the case of a single processor with a single core) or alternatively multiple containers 130(1), . . . , 130(n) can be run concurrently (e.g., in the case of multiple processors and/or multiple processor cores). Additionally, in one or more embodiments container manager 118 is configured to monitor user configuration changes that are performed within one or more of containers 130(1), . . . , 130(n). For example, container manager 118 is configured to detect changes to user preferences associated with a web site accessed in one of containers 130(1), . . . , 130(n). Host operating system 102 is configured to use these detected changes in the container and apply them to one or more related web sites that are accessed in the host operating system.

Security subsystem 120 is representative of functionality for enforcing security policy on the host operating system 102. Security subsystem 120 is configured to verify a user logging on to a device implementing the host operating system 102, handle password changes for the logged on user, create access tokens for a logged on user, and so on.

Each container 130(1), . . . , 130(n) can be implemented in different manners. One type of container that a container 130 can be implemented as is referred to as a process container. For a process container, the application processes within the container run as if they were operating on their own individual system (e.g., computing device), which is accomplished using namespace isolation. Host operation system 102 implements namespace isolation. Namespace isolation provides processes in a container a composed view consisting of the shared parts of host operating system 102 and the isolated parts of the operating system that are specific to each container such as filesystem, configuration, network, and so forth.

Another type of container that a container 130 can be implemented as is referred to as a virtualized container. For a virtualized container, the virtualized container is run in a lightweight virtual machine that, rather than having specific host physical memory assigned to the virtual machine, has virtual address backed memory pages. Thus, the memory pages assigned to the virtual machine can be swapped out to a page file. The use of a lightweight virtual machine provides additional security and isolation between processes running in a container. Thus, whereas process containers use process isolation or silo-based process isolation to achieve their containment, virtualized containers use virtual machine based protection to achieve a higher level of isolation beyond what a normal process boundary can provide. A container may also be run in a virtual machine using physical memory.

In one or more embodiments, each container 130(1), . . . , 130(n) includes one or more virtual applications 132(1), . . . , 132(n). Individual ones of the one or more virtual applications 132(1), . . . , 132(n) correspond to instances of individual ones of the applications 114 on host operating system 102. Virtual applications 132(1), . . . , 132(n) are thus useable to access untrusted network resources in one or more of containers 130(1), . . . , 130(n) in a similar manner to how one of applications 114 would access a trusted network resource on the host operating system 102.

Having considered an example system for implementing hardware-based virtualized security isolation, consider now an example architecture for the system implementing hardware-based virtualized security isolation in accordance with one or more embodiments.

System Architecture

Figure 2:
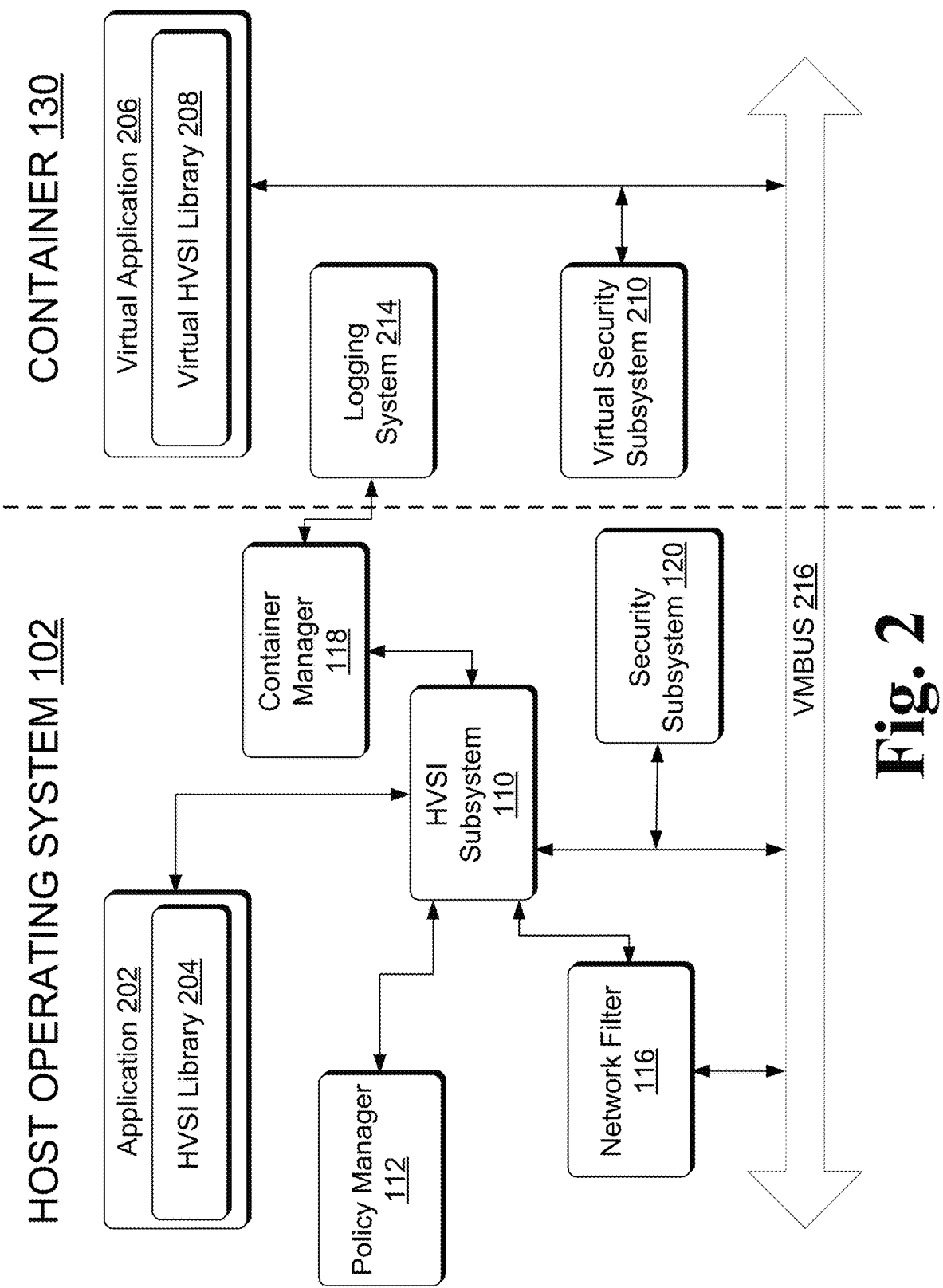
FIG. 2 illustrates an example system architecture for hardware-based virtualized security isolation in accordance with one or more embodiments.

FIG. 2 illustrates an example system architecture 200 for hardware-based virtualized security isolation in accordance with one or more embodiments. Although discussed herein as hardware-based virtualized security isolation, it is to be appreciated and understood that the techniques discussed herein may also be referred to as virtualization based isolation (VBI). System architecture 200 is implemented at least in part by a computing device. Any of a variety of different types of computing devices can be used to implement the system architecture 200, analogous to the discussion above regarding types of that can be used to implement the system 100 of FIG. 1.

In the illustrated example, the computing device implementing the system architecture 200 includes two separate and isolated portions: the host operating system 102 and the container 130. The host operating system 102 is isolated from any one or more containers 130 to protect the host operating system from attacks or infections that may result from untrusted network resources, as illustrated by the dashed line in FIG. 2.

The host operating system 102 is illustrated as including HVSI subsystem 110, policy manager 112, network filter 116, container manager 118, and security subsystem 120. Additionally, the host operating system 102 includes application 202, which may be one of applications 114 illustrated in FIG. 1. Application 202 includes HVSI library 204, the functionality of which will be discussed in further detail below.

The container 130 includes virtual application 206, which is representative of an instance of application 202 included in host operating system 102. The container 130 additionally includes a virtual security subsystem 210, the functionality of which is discussed in further detail below. Additionally, the container 130 includes a logging system 214, which is representative of functionality of content manager 118 to manage and monitor network resource activity within one or more containers 130 activated by the device implementing system architecture 200.

The host operating system 102 and the container 130, although isolated from one another, are communicatively connected via virtual machine bus 216. Virtual machine bus 216 is a communication channel that allows the host and container portions to communicate with one another. Additionally or alternatively, the host operating system 102 and the container 130 are communicatively connected via other means such as a physical network, a virtual network, simple message block (SMB) protocol, or remote procedure call (RPC) interconnections.

Having considered a system architecture for a system implementing hardware-based virtualized security isolation, consider now functionality of individual components illustrated in the host portion and the container portion of system architecture 200.

HVSI Subsystem

HVSI subsystem 110 is representative of functionality for implementing hardware-based virtualized security isolation in the computing device implementing system architecture 200. In order to implement hardware-based virtualized security isolation, HVSI subsystem 110 is configured to communicate with the policy manager 112, the network filter 116, the container manager 118, security subsystem 120, application 202, and any one or more containers 130. In one or more embodiments, HVSI subsystem 110 is automatically launched upon startup of the computing device implementing system architecture 200. Alternatively, HVSI subsystem 110 is launched at other times, such as by HVSI library 204 of application 202 when the application 202 is launched by the host operating system.

When HVSI subsystem 110 is launched, it calls container manager 118 to create a container for a user logged on to the computing device implementing system architecture 200, if a container for the user does not already exist. The container manager 118 will create a random or pseudo-random unique local account credential to use to connect to the container. This local account credential is known only to the host operating system 102 and is used to connect the host operating system 102 to the container. A transaction of the local account credential between the host operating system 102 and the container is transparent to a user of host operating system 102 and prevents malicious attacks or infections from connecting to the container over the host operating system 102's physical network Internet connection. In embodiments where host operating system 102 has multiple users, container manager 118 is configured to create separate containers for individual users. Each separate container has a different random or pseudo-random unique local account credential such that host operating system 102 is restricted from accessing any containers that were not created for a logged-on user. Container manager 118 ensures this container separation by authenticating associated user credentials before permitting accesses to one or more containers.

HVSI subsystem 110 then instructs container manager 118 to suspend the container until HVSI subsystem 110 detects that an application running on the computing device implementing system architecture 200 is attempting to access one or more untrusted network resources. HVSI subsystem 110 is configured to monitor communications between the host operating system and one or more remote resource locations based on information provided to HVSI subsystem 110 by network filter 116.

When host operating system 102 attempts to access a network resource, HVSI subsystem 110 communicates with the policy manager 112 to determine if the requested network resource is a trusted network resource. If HVSI subsystem 110 determines that the requested network resource is a trusted network resource, HVSI subsystem 110 permits the trusted network resource to be accessed by an application in host operating system 102, such as application 202. Information associated with a network resource that HVSI subsystem 110 may use to determine if the network resource is trusted includes, file type, application type, results of an anti-virus scan of the network resource, a virus signature, email source information, document metadata, URLs, IP addresses, TCP ports, DNS name, hardware device identifiers, or combinations thereof. For example, if HVSI subsystem 110 ascertains that application 202 is requesting to navigate to a particular web page, HVSI subsystem 110 compares information associated with the particular web page with one or more policies from the policy manager 112 and permits the application 202 to access the particular web page in response to determining that the particular web page is trusted. HVSI subsystem 110 determines that the particular web page is trusted, for example, based on one or more of the particular web page's fully qualified domain name (FQDN), root site domain name utilizing the domain name server (DNS), internet protocol (IP) address, or similar uniform resource locator (URL) addressing method. In accordance with one or more embodiments, HVSI subsystem 110 is additionally configured to determine if a network resource is trusted by receiving information from a cloud-based service implemented remotely from computing device 102 that maintains a list of malicious network resources. For example, if HVSI subsystem 110 ascertains that application 202 is requesting to navigate to a particular web page, HVSI subsystem 110 consults a cloud-based service via network 108 to compare the particular web page against a list of potentially malicious network resources stored at the cloud-based service. If the cloud-based service indicates that the particular web site is included in the list of potentially malicious network resources, the particular web page is determined to be untrusted.

Alternatively, if HVSI subsystem 110 determines that a requested network resource is not a trusted network resource, HVSI subsystem 110 causes container manager 118 to activate container 130 to handle the untrusted network resource. Based on the type of application that is requesting the untrusted network resource in the host system, HVSI subsystem 110 instructs the container manager 118 to launch a virtual version of the application within container 130. For example, if HVSI subsystem 110 determines that application 202 is requesting access to an untrusted network resource, HVSI subsystem 110 instructs container manager 118 to create the virtual application 206 within container 130. In this manner, container 130 is configured to interact with one or more untrusted network resources just as the host operating system 102 would interact with one or more trusted network resources. In one or more embodiments, container 130 is activated by and implemented on the device implementing host operating system 102. Alternatively, container 130 is activated by and implemented on a device that is different from the device implementing host operating system 102. Alternatively, container 130 is implemented by a device that is different from the device implementing operating system 102 but is activated by the device implementing host operating system 102.

In order for a user of the computing device implementing host operating system 102 to view and otherwise interact with any one or more untrusted network resources that are accessed by a virtual application within container 130, HVSI subsystem 110 is configured to communicate with container 130 to cause display of an interface for the virtual application 206. For example, in one or more embodiments HVSI subsystem 110 uses a remote applications integrated locally (RAIL) mode of a remote desktop protocol (RDP) using virtual machine bus 216. In this manner, host operating system 102 may display an interface of virtual application 206 at a display device of the device implementing host operating system 102. In one or more embodiments, the interface is configured so that a user of host operating system 102 perceives the interface to be part of the host operating system itself. Alternatively, HVSI subsystem 110 is configured to display an interface corresponding to virtual application 206 with a visual indication that the displayed interface corresponds to one or more untrusted network resources. In other embodiments, the HVSI subsystem 110 uses an X Window System or an alternative remote desktop implementation to display an interface corresponding to virtual application 206.

After container 130 is activated by container manager 118, network filter 116 filters all network resource calls from host operating system 102 and container 130. For example, HVSI subsystem 110 instructs network filter 116 to block all calls to untrusted network resources from host operating system 102 and allow only trusted network resource calls from host operating system 102. Similarly, HVSI subsystem 110 instructs network filter 116 to allow all calls to untrusted network resources from container 130 and block all calls to trusted network resources from container 130.

HVSI subsystem 110 is configured to instruct container manager 118 to monitor all activity associated with untrusted network resources that are accessed by container 130. When HVSI subsystem 110 receives an indication from container manager 118 that all instances of virtual applications 206 running in container 130 are terminated, HVSI subsystem 110 terminates any connection between host operating system 102 and any containers 130 being accessed by host operating system 102. HVSI subsystem 110 will then either suspend or terminate the one or more containers 130. For example, in one or more embodiments when HVSI subsystem 110 ascertains that processing of virtual application 206 has ended, HVSI subsystem 110 terminates a connection with container 130 and suspends the container to wait for further requests for untrusted network resources. Alternatively, if HVSI subsystem 110 determines that a user has logged off the device implementing system architecture 200, HVSI subsystem 110 terminates any one or more containers 130 that were activated by host operating system 102.

By communicating with components of host operating system 102, such as policy manager 112, network filter 116, container manager 118, and security subsystem 120, HVSI subsystem 110 is configured to determine if a requested network resource is trusted, restrict opening of the untrusted network resources to an isolated container, and manage one or more processes running within the isolated container. This allows HVSI subsystem 110 to perform hardware-based virtualized security isolation techniques in order to protect the device implementing host operating system 102 from kernel level attacks or infections that may be caused by untrusted network resources.

Having considered an example system architecture of a host operating system that performs hardware-based virtualized security isolation, consider now individual components of a host operating system in accordance with one or more embodiments.

Policy Manager

Policy manager 112 represents functionality of host operating system 102 for obtaining and storing one or more policies for a computing device implementing the host operating system. For example, policy manager 112 is configured to obtain and store one or more policies from the management and monitoring service 104 illustrated in FIG. 1. Each of the one or more policies specifies one or more trusted network resources that host operating system 102 is allowed to access. Additionally, a policy may specify one or more policy objects and one or more corresponding security parameters for the policy object. These policy objects and corresponding security parameters provide constraints defining how the host operating system may interact with one or more untrusted network resources.

For example, a policy object may identify whether host operating system 102 is allowed to implement virtual applications in isolated containers, such as container 130. If the corresponding security parameter for this policy object indicates that host operating system 102 is allowed to implement virtual applications and isolated containers, then the host operating system may open one or more untrusted network resources in virtual application 206 of isolated container 130. Alternatively or additionally, a policy object indicates certain virtual applications that are allowed to open in an isolated container. The corresponding security parameter for this policy object may identify one or more specific applications that are allowed to be virtually opened in an isolated container. Alternatively or additionally, a policy object indicates what host operating system 102 may copy between isolated container 130 and host operating system 102 itself. The corresponding security parameter specifies one or more file types that may be copied in between isolated container 130 and host operating system 102. Alternatively or additionally, a policy object indicates print settings for virtual applications opened in isolated container 130. The corresponding security parameter for this policy object indicates whether virtual application 206 running in isolated container 130 may print and, if so, one or more printers, applications, or file types to which virtual application 206 is allowed to print. Alternatively or additionally, a policy object indicates whether network traffic for virtual application 206 is allowed. The corresponding security parameter for this policy object may specify one or more virtual applications for which network traffic is allowed within an isolated container. Alternatively or additionally, a policy object indicates whether background tasks for virtual application 206 are allowed. The corresponding security parameter specifies one or more virtual applications for which background tasks are allowed within isolated container 130. Alternatively or additionally, a policy object indicates whether the virtual application 206 running in the container is allowed to leverage one or more hardware resources of the computing device implementing host operating system 102, such as the computing device's GPU for graphics acceleration.

The following table provides an example set of policy objects and corresponding security parameters, such as those discussed above. In accordance with standard security procedures, this example policy has a default deny rule implied, which is not illustrated. It is to be appreciated and understood however, that the discussed policy objects and corresponding security parameters are exemplary and not exhaustive in scope.

| Policy Object | Security Parameter |
| --- | --- |
| Allow Virtual Application Isolation in Container? | Yes |
| Virtual Applications for Container Isolation | Web browser, Notepad, Word processing application, email application. |
| Clipboard Settings | Text and Images Allowed |
| Print Settings | Printer 1; Print to PDF; Print to XPS |
| Network Traffic for Virtual Isolated Applications? | Enabled for web browser |
| Background Tasks for Virtual Isolated Applications? | Enabled for email application |

When host operating system 102 starts up, HVSI subsystem 110 contacts policy manager 112 to obtain a list of trusted network resources for the host operating system, along with any policy objects and corresponding security parameters. HVSI subsystem 110 aggregates these trusted network resources, policy objects, and corresponding security parameters and applies this aggregated policy to host operating system 102. In one or more embodiments, this aggregated policy is queried each time host operating system 102 requests to perform an action or attempts to access a network resource. For example, when host operating system 102 requests to open application 202 that is included in the security parameter corresponding to the policy object "Virtual Applications for Container Isolation", HVSI subsystem 110 causes host operating system 102 to open a virtual version of that application 206 in isolated container 130.

HVSI subsystem 110 is additionally configured to monitor activity within one or more of isolated container(s) 130 to ensure that the container(s) do not gain access to any trusted network resources. For example, if a virtual version of a web browser is running in isolated container 130, and HVSI subsystem 110 detects that the virtual web browser is attempting to access a network resource that is indicated by the policy manager 112 as a trusted network resource, HVSI subsystem 110 may prevent the virtual web browser from opening or otherwise accessing this trusted network resource and instead cause the trusted network resource to be opened within a corresponding web browser on host operating system 102. By restricting access and opening of trusted network resources to host operating system 102 and restricting access and opening of untrusted network resources to one or more isolated containers 130, HVSI subsystem 110 ensures that trusted network resources are not corrupted by any untrusted network resources.

In addition to receiving the list of trusted network resources, policy objects, and corresponding security parameters from the policy manager 112, host operating system 102 is configured to observe one or more local events that could impact policy for the host operating system. For example, consider a scenario where a virtual web browser is running within isolated container 130. HVSI subsystem 110 monitors the behavior of each network resource accessed by the virtual web browser within isolated container 130. When the virtual web application navigates to an untrusted network resource, downloading the untrusted network resource may cause a registry of container 130 to be written to in an unexpected manner. Using container manager 118, which is discussed in further detail below, HVSI subsystem 110 obtains data from container 130 and calculates an updated local policy for the untrusted network resource. For example, in one or more embodiments HVSI subsystem 110 updates local policy for the untrusted network resource by disabling printing and copying settings associated with the untrusted network resource. HVSI subsystem 110 is then configured to aggregate this obtained data and report the obtained data to a remote service, such as the management and monitoring service 104 illustrated in FIG. 1. In accordance with one or more embodiments, the HVSI subsystem 110 consults locally installed applications of host operating system 102, such as antivirus applications for additional information in updating this local policy. For example, HVSI subsystem 110 uses one or more antivirus applications to scan an untrusted network resource in container 130 and assign a security level to the untrusted network resource. In this manner, HVSI subsystem 110 is configured to continually update policy and further protect the computing device implementing host operating system 102 against untrusted network resources.

In one or more embodiments, HVSI subsystem 110 implements an independent host-based policy engine that responds to local activity at host operating system 102 and container 130. This independent host-based policy engine reduces round trips to the management and monitoring service 104, enabling the management and monitoring service to manage many clients. In one or more embodiments, policy manager 112 obtains a template or a signature from management and monitoring service 104. Policy manager 112 provides this template or signature to HVSI subsystem 110. When container 130 is activated, HVSI subsystem 110 computes the required policy based on a pattern from the policy template or signature that it matches to activity observed in container 130. For example, if a virtual web application is running in container 130, and a network resource the virtual web application is trying to access as a URL matches a pattern in the policy template, HVSI subsystem 110 calculates a risk level and updates the policy. This dynamically results in a specific action applied to the virtual application in container 130, such as an allow action, a block action, or a redirect action. In this embodiment, the policy is dynamic, offloading local assessment and policy from the management and monitoring service 104 to HVSI subsystem 110.

As an alternative example, consider a scenario where a user downloads and installs a new application from an untrusted web site within container 130. In this example, HVSI subsystem 110 assesses the downloaded application against existing policy, and calculates policy that applies to the downloaded application in isolated container 130. In one or more embodiments, this calculated policy is based on one or more policy objects and corresponding security parameters of similar applications. For example, if the downloaded application is an e-mail application, HVSI subsystem 110 identifies one or more policy objects and corresponding security parameters pertaining to other e-mail applications and applies similar policy settings for the downloaded e-mail application. HVSI subsystem 110 is configured to monitor activity associated with the downloaded application within container 130 and is configured to recalculate local policy based on this observed activity. Additionally or alternatively, information describing observed activity of any one or more downloaded applications or accessed network resources within container 130 is aggregated and communicated to a remote service, such as the management and monitoring service 104 illustrated in FIG. 1. In some embodiments, the host operating system 102 performs local analysis on the information describing observed activity within container 130 and calculates additional security policy. For example, if a downloaded application is exhibiting anomalous behavior, the downloaded application may be terminated and the container reset to its previous operational state prior to downloading the application. As discussed herein, anomalous behavior in the container refers to, for example, an indicator that is interpreted by HVSI subsystem 110 as an attempt to compromise a kernel or operating system of container 130.

In order to enforce policy for host operating system 102, HVSI subsystem 110 employs one or more network filters, such as network filter 116.

Network Filter

Network filter 116 is representative of functionality for intercepting and inspecting ingoing and outgoing network traffic for host operating system 102. Network filter 116 has enforcement functionality for network traffic including forwarding, blocking and/or modifying network traffic, among other capabilities. For example, network filter 116 is configured to intercept and inspect all network traffic and data communication in between host operating system 102 and any one or more isolated containers 130. Similarly, network filter 116 is configured to intercept and inspect all network traffic and data communication in between host operating system 102 and any remote resource locations accessed via network, such as network 108 illustrated in FIG. 1. In one or more embodiments, in order to interface host operating system 102 with any one or more isolated containers 130, network filter 116 includes a virtual switch, at least one network interface card for the host operating system, and one or more virtual network interface cards for the one or more isolated containers.

Using policy received from policy manager 112, HVSI subsystem 110 interfaces with network filter 116 to ensure that container 130 is not able to access trusted network resources. Similarly, HVSI subsystem 110 interfaces with network filter 116 to ensure that host operating system 102 is not able to access or otherwise open any one or more untrusted network resources. In one or more embodiments, network filter 116 is configured to change data of individual packets associated with trusted network resources to ensure the trusted data remains on host operating system 102 and does not flow to container 130. As discussed in further detail below, in a proxy authentication scenario, the network filter 116 injects credential information into network traffic to ensure proxy traversal and prevent credentials from leaking into or otherwise being accessed by the container. In some embodiments, the network filter 116 validates that network traffic is originating or terminating at a network resource that was queried during DNS lookup. To accomplish this, identifiers based on allowed network resources are plumbed inside the container and associated with one or more network resource names. A network stack in the container includes these identifiers in the network traffic. The network filter 116 validates whether an identifier matches a network resource name. If the validation is successful, the traffic is forwarded, if it fails, the traffic is dropped. In some embodiments, the network filter 116 strips the identifier from forwarded network traffic.

In accordance with one or more embodiments, network filter 116 is implemented as a virtual switch extension. Alternatively, network filter 116 is implemented as any module that has multiple abilities including to intercept, inspect, forward, modify, and block network traffic. In other embodiments the network filter is built into firewall or other security software of the computing device implementing host operating system 102. In accordance with one or more embodiments, network filter 116 is installed on host operating system 102 when policy is received at the host operating system. For example, network filter 116 may be installed when the policy manager 112 receives policy from the management and monitoring service 104 illustrated in FIG. 1. However, because network filter 116 requires resources (e.g., memory) of the device implementing host operating system 102, in one or more embodiments network filter 116 is not installed when there is no policy present on the host operating system. In this manner, when there is no policy to divert untrusted network resources to isolated containers, such as container 130, network filter 116 is not installed to reduce resource overhead.

In some embodiments, the network filter 116 enforces which network interface is used to connect to a resource. For example, while host operating system 102 is in an enterprise, security is assumed. In the enterprise, application 202 running on host operating system 102 may simply use any available physical interface (e.g. Ethernet, Wi-Fi, etc.). However, when the host operating system 102 is on a public network (e.g. outside the enterprise at a coffee shop's public Wi-Fi), the network filter 116 may only allow application 202 and other applications running on host operating system 102 to use a certain network interface, such as a VPN interface, improving network security. In some configurations, network filter 116 allows one or more applications running in container 130 to access the public network without using VPN. In embodiments where one network interface is isolated for host operating system 102 communications and a different network interface is isolated for container 130 communications, network filter 116 is configured to provide an indication to a network stack of container 130 that network communications for the container are isolated to the different network interface.

HVSI subsystem 110 calls network filter 116 and causes network filter 116 to attach itself to network ports of the device implementing host operating system 102. Once network filter 116 is attached to the network ports, it is able to monitor, filter, and/or block network traffic. In one or more embodiments, the network filter 116 includes a local DNS server to further enforce policy for host operating system 102. For example, in one or more embodiments network filter 116's DNS server maps network resources to corresponding IP addresses to verify an origin of individual network resources. In one or more implementations, the network filter 116 includes one or more input/output control systems (IOCTLs) that are configured to allow or block a network traffic for both host operating system 102 and any one or more containers 130. In other implementations this configuration is performed through an API, a file, or a command shell.

Network filter 116 is configured to monitor network traffic (e.g., HTTP traffic) to ensure that host operating system 102 and container 130 are not accessing network resources that are not allowed for the respective host operating system or container. In order to monitor HTTP traffic, network filter 116 performs HTTP header inspection with one or more web proxies facilitating network traffic between host operating system 102 and/or any one or more isolated containers 130, such as web proxy 106 illustrated in FIG. 1. Alternatively, in accordance with one or more embodiments, network filter 116 is configured to implement its own HTTP proxy.

To support network communication functions in proxied environments and across network changes, network filter 116 includes a network address translator (NAT). The NAT provides container 130 with a private network and a gateway to reach a network outside host operating system 102. In accordance with one or more embodiments, the NAT is configured to forward outside network proxy configuration and forward outside network change notifications to host operating system 102. For example, in one or more embodiments network filter 116 uses a NAT to forward network change notifications to host operating system 102 when a network connection status changes, such as when a Wi-Fi (IEEE 802.11) Network adapter leaves or enters range of a Wi-Fi Network. Additionally, network filter 116's NAT is configured to emulate an outside network identity to ensure that container 130 can identify different networks correctly. For example, the NAT can take the media access control (MAC) address of the host's external network gateway and re-use it as the private network gateway MAC address provided by NAT. This ensures that container 130's HTTP software will appropriately align the HTTP cache and ensure proxy discovery is not duplicated when reconnecting to the same network. By emulating an outside network identity, network filter 116's NAT significantly improves network reconnect performance and improve user experience for a user of host operating system 102. Additionally, network filter 116's NAT is configured to forward "low-power connected standby" settings to host operating system 102 for one or more virtual applications 206 that are running in one or more isolated containers, such as container 130. This enables host operating system 102 to keep alive any virtual applications 206 running in one or more active isolated containers 130. In one or more embodiments, functionality of the NAT is offloaded to a different component of host operating system 102. For example, provisioning a private network and gateway to reach a network outside host operating system 102, forwarding network change notifications, emulating an outside network identity, and forwarding low-power connected standby settings can be performed by one or a combination of network filter 116, HVSI subsystem 110, or container manager 118.

HVSI subsystem 110 is configured to interact with network filter 116 to perform web proxy authentication in accordance with one or more embodiments. For example, many enterprise systems use one or more web proxies to control Internet access for individual users of the enterprise. These web proxies require authentication before allowing individual users or applications to access network resources, such as web sites, by prompting user credentials such as a username and associated password. Accordingly, network filter 116 is configured to identify a web proxy that is required to facilitate access to a web site, such as web proxy 106 illustrated in FIG. 1. However, in scenarios where a virtual application running in an isolated container requires web proxy authentication, security concerns arise. For example, one or more untrusted network resources that are open and running in the isolated container 130 might gain unauthorized access to the user credentials and compromise security of associated user accounts.

In order to provide a seamless user experience for virtual applications 206 running in container 130 that require web proxy authentication, HVSI subsystem 110 is configured to provide user credentials to a web proxy from host operating system 102 without providing the user credentials to container 130. HVSI subsystem 110 is configured to provide user credentials to a web proxy for virtual application 206 running in container 130 by implementing virtual security subsystem 210 within the isolated container. Virtual security subsystem 210 is configured to interface with security subsystem 120 of host operating system 102. For example, in one or more embodiments HVSI subsystem 110 detects that virtual web application 206 is calling a network resource that requires web proxy authentication. HVSI subsystem 110 is configured to implement virtual security subsystem 210 within the isolated container so that the virtual security subsystem 210 can interface with security subsystem 120 of host operating system 102. Communication between virtual security subsystem 210 and security subsystem 120 may be performed over the connection established by HVSI subsystem 110, such as via virtual machine bus 216.

When virtual web application 206 in container 130 attempts to access a network resource via a web proxy, the web proxy returns with a challenge for user credentials. In this scenario, virtual security subsystem 210 is configured to call security subsystem 120 of host operating system 102 to provide authentication to the web proxy. In response to receiving this call, security subsystem 120 is configured to generate a dummy credential blob that indicates ownership of the user credentials without actually containing the user credentials within the credential blob. As discussed herein, a dummy blob may also be referred to as a pseudo-authentication of the user credentials. Security subsystem 120 returns the generated dummy credential blob to virtual security subsystem 210. Virtual security subsystem 210 then provides the dummy credential blob to virtual web application 206 so that the virtual web application can embed the dummy credential blob in an HTTP response to the web proxy. In this manner, container 130 is configured to prove ownership of user credentials without receiving the actual user credentials from host operating system 102. In accordance with one or more embodiments, proof of credential ownership within the dummy blob is performed by applying a hash security function to the actual credentials and including the hashed credentials within the dummy blob. This ensures that user credentials are not compromised by any untrusted network resources that may be running in container 130.

Alternatively, if virtual security subsystem 210 forwards a web proxy request for user credentials to security subsystem 120 of host operating system 102, security subsystem 120 is configured to generate two credential blobs. The first credential blob generated by security subsystem 120 is a dummy credential blob as described above. The second credential blob generated by security subsystem 120 contains the actual user credentials requested by the web proxy. In this scenario, the dummy credential blob is provided to the virtual security subsystem 210 in container 130, and the blob containing the actual user credentials is provided to network filter 116 in host operating system 102. As discussed above, virtual web application 206 is configured to receive the dummy credential blob from virtual security subsystem 210 and embed the dummy credential blob in an HTTP response to the web proxy. Because all network traffic from both host operating system 102 and container 130 are filtered through network filter 116, network filter 116 is configured to intercept the HTTP response from the container and replace the dummy blob with the actual user credential blob before transmitting the HTTP response to the web proxy. In accordance with one or more embodiments, where host operating system 102 is functioning in a nested computing environment, this credential blob replacement may be performed multiple times, at each layer of the nested environment. Alternatively, in one or more embodiments, network filter 116 plumbs allowed network resource identifiers within container 130 to validate that network traffic is originating and terminating at a network resource that was queried during DNS lookup, as discussed above.

When HVSI subsystem 110 determines that host operating system 102 is attempting to access an untrusted network resource, using policy manager 112, network filter 116, and security subsystem 110 as discussed herein, HVSI subsystem 110 communicates with container manager 118 to manage and monitor one or more containers 130 for accessing the untrusted network resource.

Container Manager

Container manager 118 is responsible for activating one or more containers 130 that are isolated from host operating system 102 to access untrusted network resources. As discussed herein, activating a container such as container 130 includes creating one or more new containers or resuming running of one or more suspended containers. Container manager 118 is additionally configured to activate one or more containers for an individual user logged into host operating system 102 and ensure that any other users of the host operating system are restricted from accessing the activated one or more containers for the individual user. Container manager 118 ensures a mapping of the user logged into host operating system 102 to the container 130. In some embodiments in which there are multiple users of host operating system 102 and multiple containers, the container manager 118 is configured to see a logged-on user's identity and directly associate that with one or more corresponding containers. This restriction prevents other users from viewing or otherwise interacting with the containers.

Container manager 118 is further configured to collect logs and traces describing activity within container 130. Container manager 118 is configured to use these logs and traces to monitor container usage for telemetry and security indicators. In accordance with one or more embodiments, container manager 118 consults with local applications installed on host operating system 102, such as an antivirus application, in order to interpret any security issues associated with monitored activity in container 130. Container manager 118 is configured to aggregate this monitored information and provide the monitored information to HVSI subsystem 110. Alternatively or additionally, container manager 118 is configured to provide this monitored information to one or more remote sources, such as management and monitoring service 104 illustrated in FIG. 1.

When host operating system 102 starts up, HVSI subsystem 110 determines whether policy is present. In one or more embodiments, HVSI subsystem 110 determines whether policy is present by communicating with policy manager 112, as discussed herein. If HVSI subsystem 110 determines that policy is present on host operating system 102, container manager 118 is configured to activate container 130 to handle any untrusted network resources that are requested by the host operating system. Container manager 118 is configured to activate container 130 by communicating with host operating system 102 to determine if a container base image exists. If container manager 118 determines that a container base image does not exist, container manager 118 is configured to create a container base image. If container manager 118 determines that a container base image does exist, or after container manager 118 creates a container base image, container manager 118 waits for a user to log onto host operating system 102.

A container base image contains information required to create and activate an isolated container that includes its own operating system, such as container 130. For example, in one or more embodiments a container base image contains information describing how host operating system 102 is to set registry settings for a container. Information regarding registry settings is required because some virtual applications that are opened inside container 130 behave differently than a version of the application that would be opened on host operating system 102. Additionally or alternatively, a container base image includes information describing how to create a user account within a virtual application executed in container 130. Additionally or alternatively, the container base image includes information regarding an amount of allocated resources, such as memory, processors, disks, or networks, which may be required by container 130 when active.

When a user logs onto host operating system 102, container manager 118 determines whether a container corresponding to the container base image exists. If container manager 118 determines that a container does not exist for the container base image, container manager 118 may create a container, such as container 130. To ensure that a container base image accurately represents the host operating system 102, container manager 118 is configured to invalidate any existing container base images and create one or more new container base images after an operating system update. In this manner, container manager 118 ensures that a container base image includes any updated host operating system binaries, thereby keeping containers created from the container base image up to date with the host operating system 102. In the event of a host operating system 102 update, container manager 118 is configured to either force close any open containers or wait until user activity in the container has ceased to delete the container base image and create a new container base image. After creating the container, container manager 118 places the container into a suspended mode. When a container is in a suspended mode, the container consumes fewer resources of the device implementing host operating system 102, thereby reducing resource overhead. Container manager 118 is configured to maintain one or more isolated containers 130 in a suspended mode until host operating system 102 requests access to one or more untrusted network resources.

When HVSI subsystem 110 detects that host operating system 102 is requesting access to one or more untrusted network resources, HVSI subsystem 110 instructs container manager 118 to activate one or more suspended containers in order to handle the one or more untrusted network resources. In one or more embodiments, the one or more containers are hosted on the computing device that is implementing host operating system 102. Alternatively, at least one of the one or more containers may be hosted on a computing device that is remote from the computing device implementing host operating system 102. In a scenario where a container is hosted on a different computing device, container manager 118 is configured to communicate with the different computing device to manage and monitor the remote containers. Because the container manager 118 can activate a suspended container faster than it can create a container, maintaining one or more suspended containers allows host operating system 102 to quickly respond to requests for untrusted network resources.

In response to determining that host operating system 102 is requesting access to one or more untrusted network resources, container manager 118 is configured to identify an application on the host operating system that is requesting the untrusted network resource. Container manager 118 is configured to launch a virtual version of the application within container 130 to handle the untrusted network resource. After container manager 118 activates a virtual version of the application within container 130, HVSI subsystem 110 is configured to remote into container 130 to display an interface of the virtual application at a display of the device implementing host operating system 102.

Container manager 118 is configured to communicate with HVSI subsystem 110 to ensure that appropriate hardware virtualization technology exists on host operating system 102, and in container 130, if the container is hosted by a remote computing device. For container manager 118 to function properly, the container manager 118 is configured to verify that host operating system 102's application programming interfaces (APIs) are available to manage isolated container lifecycles and associated network stacks.

Container manager 118 is configured to monitor activity within container 130 using logging system 214. In this manner, container manager 118 is configured to detect any suspicious behavior of a network or network resource that is accessed within container 130, whether container 130 is taking up too much disk space, and so on. Based on information obtained from logging system 214, container manager 118 is able to inform HVSI subsystem 110 how to manage one or more containers 130. For example, in one or more embodiments container manager 118 ascertains that access to one or more untrusted network resources within container 130 has completed and communicates this information to HVSI subsystem 110. In response to receiving this information, HVSI subsystem 110 places container 130 into a suspended mode until it is subsequently needed to handle an additional untrusted network resource.

Container manager 118 is also configured to monitor and determine when a user of host operating system 102 logs off. In response to determining that a user of host operating system 102 has logged off, container manager 118 provides this information to HVSI subsystem 110. HVSI subsystem 110 is configured to delete one or more containers 130 in response to the user logging off. As discussed herein, deleting a container also clears any information included within the container.

Container manager 118 is also configured to share DNS and Hypertext Transfer Protocol (HTTP) information from the host operating system 102 to improve web browsing performance or other network activity within the one or more of the isolated containers. In one or more embodiments, container manager 118 maintains a cache of DNS queries made from earlier instances where container 130 accessed network resources, as well as HTTP data such as Internet data files or web site cookies that enable future requests in a container to access untrusted web sites to remember one or more of previous user preferences, configurations, or settings.

In addition to receiving information regarding monitored activity within container 130 from container manager 118, HVSI subsystem 110 is also configured to receive information regarding container activity from one or more HVSI libraries 208.

HVSI Library

As discussed herein, an HVSI library is a small, lightweight, asynchronous library, which is configured to be linked either statically or dynamically within an application. For example, in the illustrated system architecture 200 of FIG. 2, application 202 includes HVSI library 204 and virtual application 206 includes virtual HVSI library 208. Each HVSI library is configured to run inside its respective application and is responsible for intercepting and forwarding network resource calls from the application to HVSI subsystem 110.

When a user of host operating system 102 attempts to open a network resource via application 202, HVSI library 204 communicates information regarding the requested network resource to HVSI subsystem 110. HVSI subsystem 110 compares this information against one or more policies obtained from policy manager 112 to determine whether the requested network resource is a trusted network resource. If HVSI subsystem 110 determines that the requested network resource is a trusted network resource, HVSI subsystem 110 allows application 202 to access the requested network resource. Alternatively, if HVSI subsystem 110 determines that the requested network resource is not a trusted network resource, HVSI subsystem 110 forwards the untrusted network resource to virtual application 206 in container 130.

Virtual HVSI library 208 in container 130 is configured to intercept network resource requests from virtual application 206 and communicate information regarding the requested network resources to HVSI subsystem 110. HVSI subsystem 110 is similarly configured to compare this information against any policies for host operating system 102 to ensure that no trusted network resources are provided to container 130. In one or more embodiments, a virtual application will not link to virtual HVSI library 208 to ensure compatibility. In these embodiments, logging system 214 and network filter 116 operate to intercept network resource requests from the virtual application and communicate information regarding the requested network resources to HVSI subsystem 110.

Having considered a system architecture for a system implementing hardware-based virtualized security isolation to protect a computing device from attacks or infections associated with untrusted network resources, consider now example procedures in accordance with one or more embodiments.

Example Procedures

FIG. 3 is a flowchart illustrating an example process 300 for implementing hardware-based security isolation in accordance with one or more embodiments. Process 300 is carried out by a system, such as system 100 of FIG. 1, and can be implemented in software, firmware, hardware, or combinations thereof. Process 300 is shown as a set of acts and is not limited to the order shown for performing the operations of various acts. Process 300 is an example process for implementing hardware-based virtualized security isolation; additional discussions of implementing hardware-based virtualized security isolation are included herein with reference to different figures.

In process 300, attempted access to a network resource is detected (act 302). Attempted access is detected when a user, administrator, program, application, or other entity of the system requests one or more network resources from one or more locations that are located remotely from the system. For example, attempted access to a network resource is detected when a user of the system attempts to navigate to a webpage using a web application.

In response to detecting attempted access to a network resource, process 300 proceeds to determine if the network resource is trusted (act 304). The determination of whether the network resource is trusted is performed by comparing the network resource with policy that is either stored on the host operating system or accessed remotely by the host operating system. For example, in one or more embodiments the host operating system locally stores policy, such as in policy manager 112 of FIG. 1, which enumerates a list of trusted network resources. Alternatively or additionally, policy is received from a management and monitoring service that is remote from the host operating system, such as from management and monitoring service 104 of FIG. 1. Additionally or alternatively, the host operating system updates local policy based on monitored activity associated with network resource activity at the host operating system and associated containers. As discussed herein, policy may be continuously updated to maintain a current list of trusted network resources.

In response to determining that the network resource is a trusted network resource, process 300 allows the network resource to be accessed by an application on the host operating system (act 312). For example, if process 300 is carried out by system 100 of FIG. 1, and it is determined that the network resource is a trusted network resource, process 300 will allow one of applications 114 on host operating system 102 to access the trusted network resource.

In response to determining that the network resource is not a trusted network resource, process 300 determines whether hardware-based virtualized security isolation is enabled on the host operating system (act 306). If the process determines the hardware-based virtualized security isolation is not enabled, the process allows an application on the host operating system to access the untrusted network resource (act 312). Accordingly, a host operating system that does not enable hardware-based virtualized security isolation as discussed herein permits an untrusted network resource to be accessed by an application on the host operating system, thereby exposing a device implementing the host operating system to malicious attacks or infections from the untrusted network resource.

Alternatively, if process 300 determines that hardware-based virtualized security isolation is enabled, the process proceeds to activate a container (act 308). As discussed herein, activating a container includes creating a container in accordance with one or more embodiments. Alternatively or additionally, activating a container includes identifying a suspended container and resuming processing of the suspended container. As discussed herein, a container represents an isolated runtime environment that is separate from the host operating system, such as host operating system 102. The container includes its own kernel that is separate from a kernel of the host operating system, and thus protects from kernel level attacks associated with the untrusted network resource that may be directed to the host operating system. Accordingly, even if the container becomes compromised, the host operating system is isolated and protected from any infection or attack associated with untrusted network resources.

In response to activating the container, the host operating system allows the container to access the network resource (act 310). The host operating system continues to monitor activity in the container associated with network resource and any one or more additional network resources that are called by the container to ensure that no trusted network resource is accessed by the container. Similarly, the system ensures that no untrusted network resource is accessed by the host operating system.

Having considered an example procedure for implementing hardware-based virtualized security isolation at a host operating system to protect a device implementing the host operating system from attacks or infections associated with untrusted network resources, consider now an example procedure that can be utilized to activate a container for hardware-based virtualized security isolation.

Figure 4:
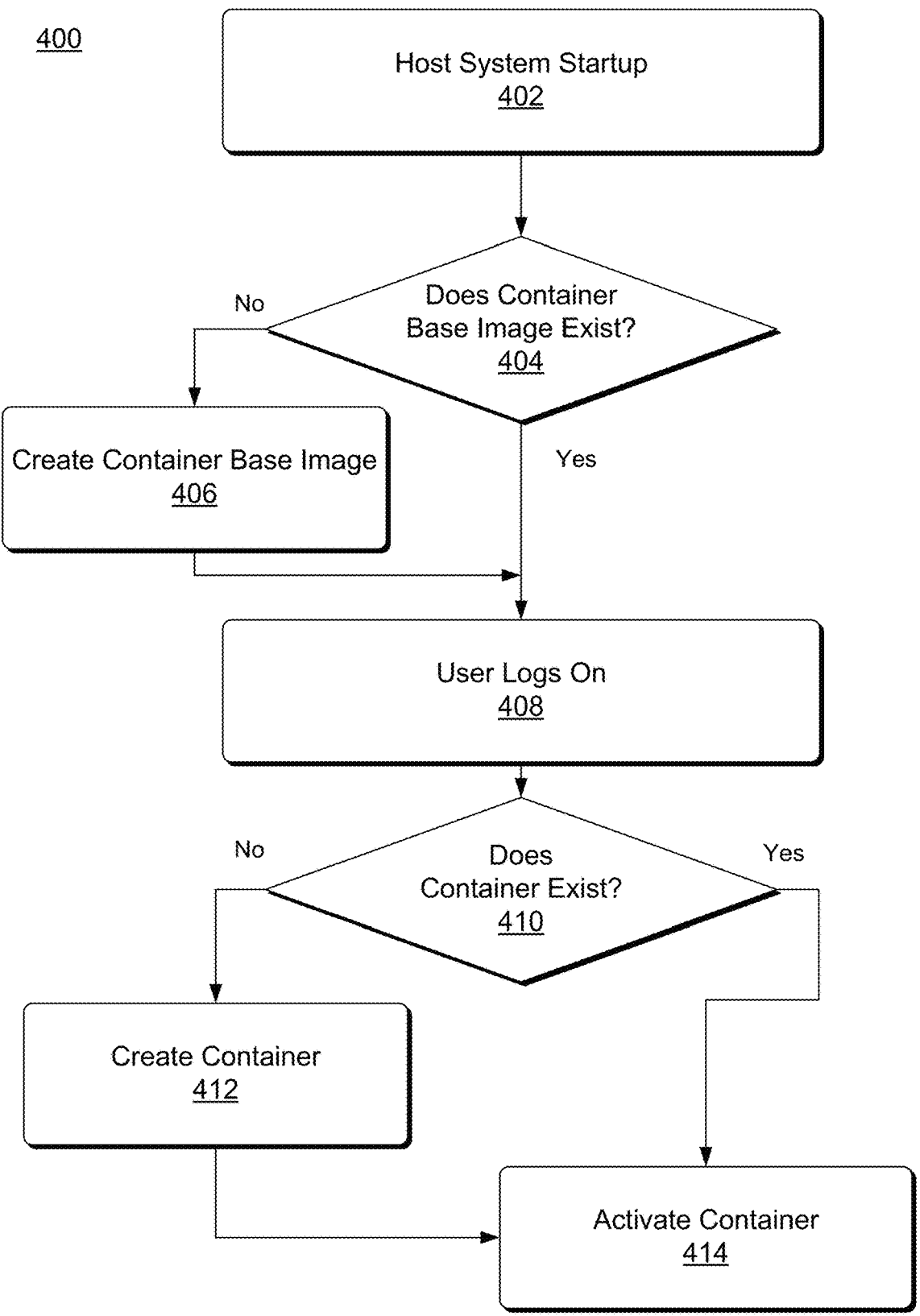
FIG. 4 is a flowchart illustrating an example process for activating a container for hardware-based virtualized security isolation in accordance with one or more embodiments.

FIG. 4 is a flowchart illustrating an example process 400 for activating a container for hardware-based virtualized security isolation in accordance with one or more embodiments.

Process 400 is carried out by a host operating system, such as host operating system 102 of FIG. 1, and can be implemented in software, firmware, hardware, or combinations thereof. Process 400 is shown as a set of acts and is not limited to the order shown for performing the operations of various acts. Process 400 is an example process for activating a container for hardware-based virtualized security isolation; additional discussions of activating a container for hardware-based virtualized security isolation are included herein with reference to different figures.

In process 400, the host operating system starts up (act 402). After the host operating system has started up, the host operating system proceeds to determine whether a container base image exists (act 404).

If the host operating system determines that a container base image does not exist, the host operating system proceeds to create a container base image (act 406). If the host operating system determines that a container base image does exist, or in response to creating a container base image, the host operating system waits until a user logs on (act 408). A user may log onto the host operating system by entering one or more credentials that are uniquely associated with the user such as a username, a password, and so on.

After a user logs on, the host operating system determines whether a container exists for the logged on user (act 410). As discussed herein, the container is unique to an individual user and allows the user to interact with untrusted network resources in an isolated runtime environment that is separate from the host operating system.

If the host operating system determines that no container exists for the logged on user, the host operating system proceeds to create a container for the logged on user (act 412). The host operating system is configured to create a container for the logged on user in accordance with any one or more of the techniques discussed herein.

If the host operating system determines that a container does exist for the logged on user, or after the host operating system has created a container for the logged on user, the host operating system proceeds to activate the container for the logged on user (act 414). In this manner, the host operating system activates a container when a user logs onto the host operating system that is prepared to process any untrusted network resources that are requested by the host operating system.

Having considered an example procedure for activating a container for hardware-based virtualized security isolation to protect a host operating system from untrusted network resources, consider now an example procedure for managing a container for hardware-based virtualized security isolation.

Figure 5:
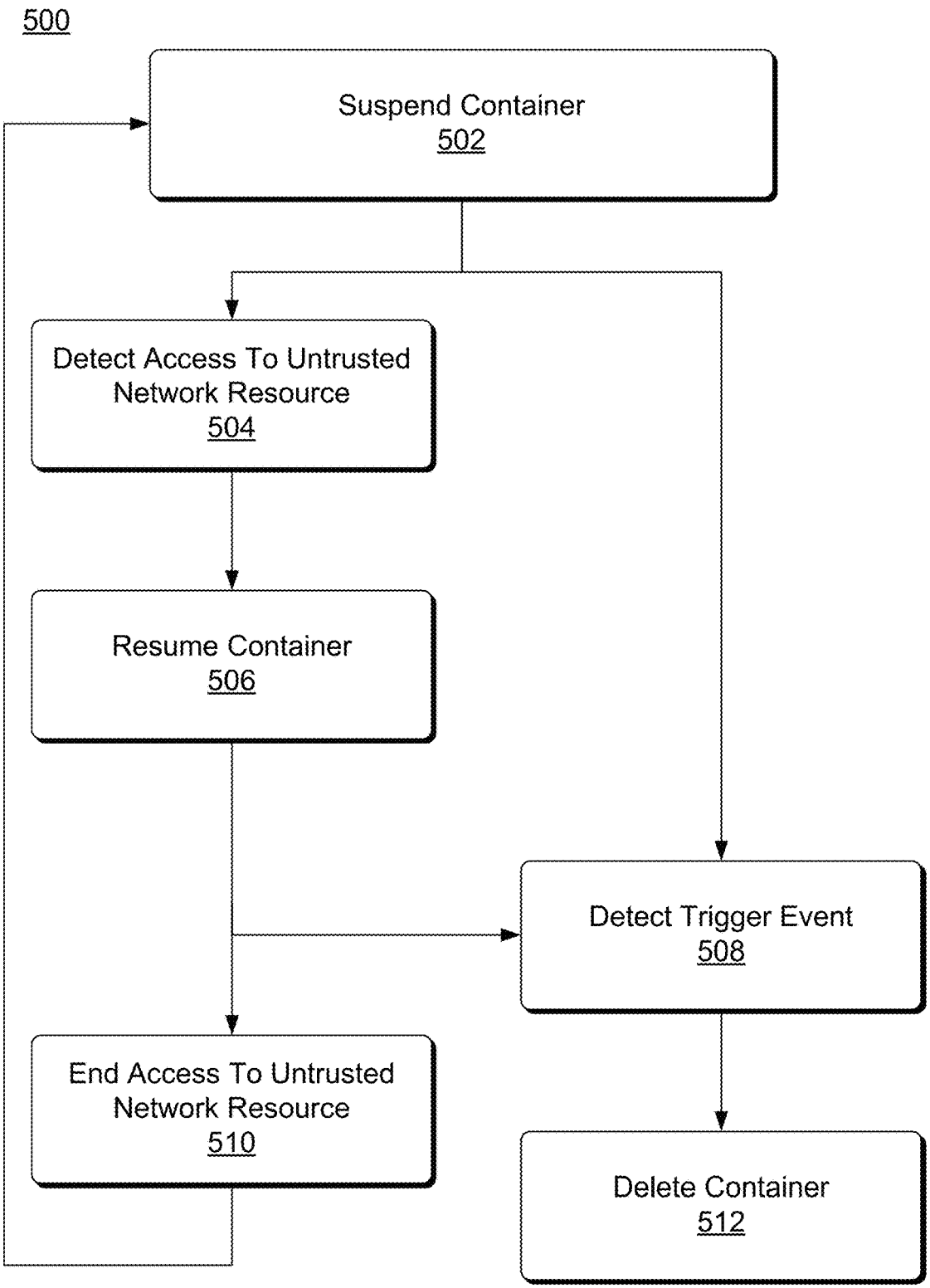
FIG. 5 is a flowchart illustrating an example process for managing a container for hardware-based virtualized security isolation in accordance with one or more embodiments.

FIG. 5 is a flowchart illustrating an example process 500 for managing a container for hardware-based virtualized security isolation in accordance with one or more embodiments.

Process 500 is carried out by a host operating system, such as host operating system 102 of FIG. 1, and can be implemented in software, firmware, hardware, or combinations thereof. Process 500 is shown as a set of acts and is not limited to the order shown for performing the operations of various acts. Process 500 is an example process for managing a container for hardware-based virtualized security isolation; additional discussions of managing a container for hardware-based virtualized security isolation are included herein with reference to different figures.

In process 500, after a user has logged on to a host operating system and a container has been activated for the logged on user, the host operating system suspends the container (act 502). By suspending the container, the host operating system reduces the amount of system resources for a device implementing the host operating system that are required to maintain an active container. Because resuming a suspended container can be performed more rapidly than creating a container, the host operating system implementing process 500 is configured to quickly respond to a request to access an untrusted network resource.

The host operating system implementing process 500 continues to monitor requests for network resources until it detects attempted access to an untrusted network resource (act 504). Detecting attempted access to an untrusted network resource is performed by comparing information describing the requested network resource against policy for the host operating system implementing process 500, as discussed herein. For example, in one or more embodiments a user of the host operating system implementing process 500 attempts to access a web site that is not defined by policy as a trusted web site.

In response to detecting access to an untrusted network resource, the host operating system implementing process 500 activates the suspended container (act 506). Once the suspended container is activated, the host operating system allows a virtual instance of an application running in the container to access the untrusted network resource. The host operating system may be configured to communicate with the container via a virtual machine bus to install and activate the virtual instance of the application and to cause display of an interface of the virtual instance of the application. In this manner, the container allows a user of the host operating system implementing process 500 to interface with one or more untrusted network resources while the one or more untrusted network resources are operated within a contained runtime environment that is isolated from the host operating system.

The host operating system implementing process 500 is configured to maintain the container in an active state until a trigger event is detected (act 508) or until the host operating system determines that access to any one or more untrusted network resources has ended (act 510). For example, if the host operating system implementing process 500 identifies one or more web sites opened in a web application as untrusted network resources, the system may identify that access to the one or more untrusted network resources has ended in response to the user closing the web application. If the host operating system determines that access to one or more untrusted network resources has ended, the host operating system suspends the container (act 502). By suspending the container when the container is not accessing any untrusted network resources, the host operating system reduces the amount of system resources required to maintain an active container. Similarly, by suspending the container rather than deleting the container, the host operating system can readily activate the suspended container upon detecting attempted access to one or more additional untrusted network resources.

In response to detecting a trigger event, the host operating system is configured to delete the container (act 512). As discussed herein, a trigger event may refer to detecting that a user of the host operating system implementing process 500 has logged off. Additionally or alternatively, a trigger event is detected when anomalous behavior is detected in the container.

Having considered an example procedure for managing a container for hardware-based virtualized security isolation to protect a device implementing the host operating system from attacks and infections associated with untrusted network resources, consider now an example procedure that can be utilized to implement hardware-based virtualized security isolation on a host operating system.

Figure 6:
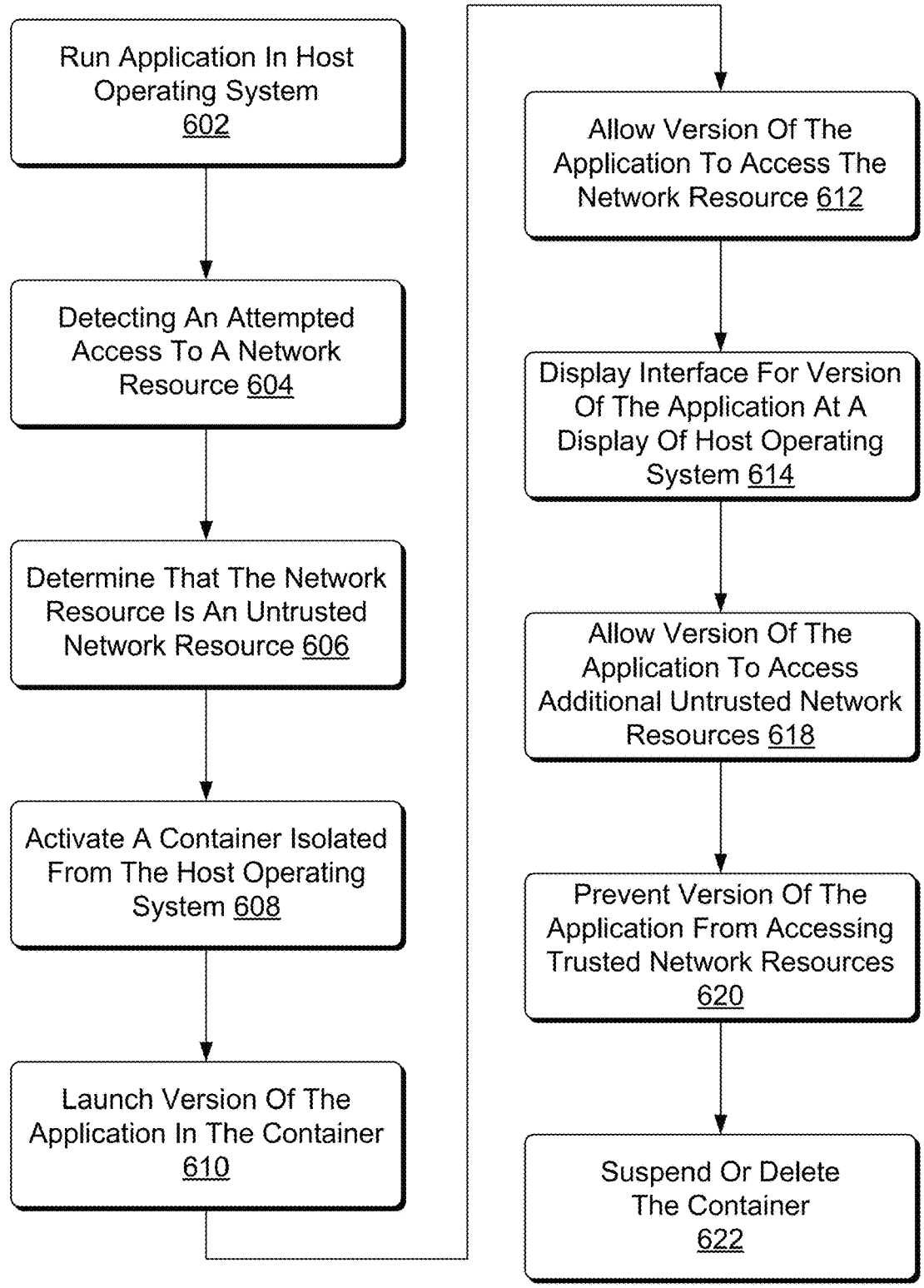
FIG. 6 is a flowchart illustrating an example process for implementing hardware-based virtualized security isolation in accordance with one or more embodiments.

FIG. 6 is a flowchart illustrating process 600 for implementing hardware-based virtualized security isolation on a host operating system in accordance with one or more embodiments.

Process 600 is carried out by a host operating system, such as host operating system 102 of FIG. 1, and can be implemented in software, firmware, hardware, or combinations thereof. Process 600 is shown as a set of acts and is not limited to the order shown for performing the operations of various acts. Process 600 is an example process for using one or more containers for hardware-based virtualized security isolation; additional discussions of using one or more containers for hardware-based virtualized security isolation are included herein with reference to different figures.

In process 600, a host operating system runs an application (act 602). The application may be any type of application, such as a web application, a word processing application, an email application, and so on.

The host operating system detects that the application is attempting to access a network resource (act 604). The host operating system is configured to detect that the application is requesting access to a network resource by monitoring network communications using a network filter, as discussed herein.

In response to detecting that the application running in the host operating system is requesting access to a network resource, the host operating system determines that the network resource is an untrusted network resource (act 606). The host operating system is configured to determine that the network resource is untrusted by comparing the network resource against one or more policies for the host operating system, as discussed herein.

In response to determining that the network resource is an untrusted network resource, the host operating system is configured to activate a container that is isolated from the host operating system (act 608). As discussed herein, a container that is isolated from the host operating system includes its own kernel that is separate and isolated from a kernel of the host operating system, thereby protecting the host operating system from kernel attacks.

After the host operating system activates the isolated container, the host operating system launches a virtual version of the application that requested the untrusted network resource within the isolated container (act 610). The virtual version of the application launched within the isolated container is configured to handle the requested network resource in a manner similar to how the application running on the host operating system would handle the requested network resource.

In response to launching the virtual version of the application in the isolated container, the host operating system passes the untrusted network resource to the isolated container and allows the version of the application running in the isolated container to access the untrusted network resource (act 612). In response to launching the version of the application in the isolated container, the host operating system is also configured to display an interface for the version of the application operating within the isolated container at a display of the device implementing the host operating system (act 614). Thus, the host operating system enables a user to interface with the virtual version of the application launched within the isolated container without exposing the host operating system to one or more untrusted network resources that are accessed by the isolated container.

While the virtual version of the application within the isolated container is running, the host operating system is configured to allow the virtual version of the application in the isolated container to access one or more additional untrusted network resources (act 618). The host operating system is configured to allow the version of the application running within the isolated container to access untrusted network resources by monitoring network communications between the isolated container and one or more network resource locations.

Similarly, while the virtual version of the application within the isolated container is running, the host operating system is configured to prevent the virtual version of the application in the isolated container from accessing one or more trusted network resources (act 620). In this manner, the host operating system is configured to ensure that only trusted network resources are accessed by the host operating system and that any untrusted network resources are accessed only by the one or more isolated containers.

In response to determining that the virtual version of the application running within the isolated container is no longer accessing one or more untrusted network resources, or in response to determining that a user of the host operating system has logged off, the host operating system is configured to suspend or delete the one or more isolated containers (act 622). For example, in response to determining that the version of the application within the container is no longer accessing one or more untrusted network resources, the host operating system suspends the container until it is needed to handle one or more additional untrusted network resources. If the host operating system detects that a user has logged off, the host operating system deletes the one or more containers, whether active or suspended.

Example System

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), a sensor (e.g. an ambient light sensor or a motion sensor), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a host operating system 714. The host operating system 714 provides various management of hardware-based virtualized security isolation, as discussed above. The host operating system 714 can implement, for example, the host operating system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722. It should be noted that the cloud 722 can be arranged in a myriad of configurations. For example, the cloud 722 can be implemented as a single cloud, as multiple instances of cloud 722 all behaving as a single cloud, or with one or more instances of platform 724 implemented behind the cloud 722 and behaving as if the one or more instances of platform 724 were implemented in the cloud.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: running an application in a host operating system; detecting an access to a network resource by the application; determining whether the network resource is a trusted network resource or an untrusted network resource; and in response to determining that the network resource is an untrusted network resource: activating, by the host operating system, a container that is isolated from the host operating system and configured to run a version of the application; and allowing, by the host operating system, the version of the application running in the container to access the untrusted network resource.

Alternatively or in addition to any of the above described methods, any one or combination of: the method further comprising allowing the version of the application running in the container to access one or more additional untrusted network resources and preventing the application running in the container from accessing trusted network resources; the method further comprising detecting an access to a file or an application by the host operating system and, in response to determining that the file or the application is an untrusted network resource, allowing the file or the application to be opened within the container; wherein the container includes an instance of the host operating system and a kernel that is separate and isolated from a kernel of the host operating system; the method further comprising receiving at least one policy that includes at least an enumerated list of trusted network resources, wherein determining whether the network resource is a trusted network resource or an untrusted network resource comprises comparing the network resource against the enumerated list of trusted network resources, the enumerated list of trusted network resources being identified based on one or more of a file type of the network resource, a network location associated with the network resource, or an application type that is attempting to access the network resource; wherein the container is activated for a user that is logged on to the host operating system, the method further comprising determining that a different user is logged on to the host operating system and activating, for the different user, a different container that is isolated from the host operating system and the container; the method further comprising determining that the access to the network resource is requested over an untrusted network interface and, in response to determining that the access to the network resource is requested over the untrusted network interface: restricting network communications for the application in the host operating system to a virtual private network (VPN) interface, allowing the version of the application running in the container to perform network communications over the untrusted network interface, and indicating to a network stack of the container that network communications for the container are isolated to the untrusted network interface; the method further comprising intercepting, by the host operating system, a response to a web proxy prompt for user credentials and inserting one or more user credentials into the response to the web proxy prompt without communicating the one or more user credentials to the container; the method further comprising scanning one or more untrusted network resources that are accessed in the container and using antivirus software in the host operating system to assign one or more risk levels to the one or more untrusted network resources and quarantine, clean, or delete one of the one or more untrusted network resources if the assigned risk level indicates that the untrusted network resource is malicious; the method further comprising monitoring activity associated with the untrusted network resource in the container and updating local policy at the host operating system based on the monitored activity; wherein the application is a web application and the untrusted network resource is a web page; wherein the container is activated for network resource communications over a first network communication interface, the method further comprising activating a second container for network resource communications over a second network communication interface; the method further comprising: detecting that the version of the application running in the container has stopped processing, in response to detecting that the version of the application running in the container has stopped processing, suspending, by the host operating system, the container to reduce an amount of system resources used by the container, detecting an additional access to an additional network resource by the application, activating the suspended container in response to determining that the additional network resource is an untrusted resource, allowing the version of the application running in the container to access the additional untrusted network resource, detecting that a user of the host operating system has logged off, and deleting the container in response to detecting that the user has logged off; the method further comprising detecting an update to the host operating system and, in response to detecting the update to the host operating system, deleting the container and creating a new container that reflects one or more updated binaries of the host operating system; wherein the host operating system is configured to determine whether the network resource is a trusted network resource based on one or more of a file type of the network resource, a network location associated with the network resource, an application type that is attempting to access the network resource, anti-virus scanning of the network resource, or based on consulting a cloud-based service that maintains a list of malicious network resources; wherein the container is activated for a user that is logged on to the host operating system, the method further comprising activating one or more additional containers for the user and preventing other users of the host operating system from accessing the container and the one or more additional containers; the method further comprising receiving a request from the version of the application running in the container for user credentials and providing a pseudo-authentication to the version of the application running in the container that includes information proving ownership of the user credentials without providing the user credentials to the container; the method further comprising identifying, by the host operating system, a local network and emulating the local network for the container; the method further comprising identifying a local network and emulating the local network behind a network address translator (NAT) for the container; the method further comprising sharing Domain Name System (DNS) and HyperText Transfer Protocol (HTTP) information between the host operating system and the container; the method further comprising tracking, by the host operating system, one or more configuration changes performed by the version of the application running in the container; the method further comprising obtaining, by the host operating system, telemetry from the container and analyzing container activity based on the obtained telemetry; the method further comprising implementing a policy engine at the host operating system that is configured to compute policy for the container based on monitored activity within the container, the computed policy being based on one or more policy templates or policy signatures.

A method comprising: detecting startup of a host operating system; in response to detecting startup of the host operating system, determining whether a container base image exists in the host operating system; in response to determining that the container base image does not exist in the host operating system, creating a container base image from the host operating system; detecting a user login to the host operating system; in response to detecting the user login to the host operating system, activating a container corresponding to the container base image and suspending the activated container; resuming the suspended container in response to detecting access to an untrusted network resource; and allowing the resumed container to access the untrusted network resource.

Alternatively or in addition to any of the above described methods, any one or combination of: wherein the container base image is created from one of: the host operating system, an operating system that is different from the host operating system, or a combination of the host operating system and the operating system that is different from the host operating system.

A device comprising: one or more processors; and one or more computer-readable storage media storing computer-readable instructions that are executable by the one or more processors to perform operations comprising: running a web application on a host operating system of the device; detecting access to a network resource by the web application; determining that the network resource is an untrusted resource by comparing the network resource to a policy received from a management and monitoring service that is located remotely from the device; in response to determining that the network resource is an untrusted network resource: activating, by the host operating system, a container that is isolated from the host operating system and configured to run a version of the web application; allowing, by the host operating system, the version of the web application running in the container to access the untrusted network resource; allowing the version of the web application running in the container to access one or more additional untrusted network resources; and preventing the version of the web application running in the container from accessing trusted network resources.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a host operating system executing on a host device, comprising:
   detecting that an application that is running on the host operating system is attempting to access a network resource that is accessible to the host device via a network;
   in response to detecting that the application is attempting to access the network resource, determining whether the network resource is an untrusted network resource;
   in response to determining that the network resource is an untrusted network resource:
   activating a container that is isolated from the host operating system, the container being configured to run a version of the application; and
   passing the untrusted network resource to the container thereby allowing the version of the application running in the container to access the untrusted network resource; and
   in response to determining that access to the untrusted network resource has ended, suspending the container.

2. The method as recited in claim 1, further comprising allowing the version of the application running in the container to access one or more additional untrusted network resources and preventing the version of the application running in the container from accessing trusted network resources.

3. The method as recited in claim 1, wherein detecting that the application is attempting to access the network resource comprises detecting that the application is attempting to access a file or another application and wherein allowing the version of the application running in the container to access the untrusted network resource comprises allowing the file or the other application to be opened within the container.

4. The method as recited in claim 1, further comprising receiving at least one policy that includes at least an enumerated list of trusted network resources, wherein determining that the network resource is an untrusted network resource comprises comparing the network resource against the enumerated list of trusted network resources, the enumerated list of trusted network resources being identified based on one or more of a file type of the network resource, a network location associated with the network resource, or an application type that is attempting to access the network resource.

5. The method as recited in claim 1, wherein the container is activated for a user that is logged on to the host operating system, the method further comprising determining that a different user is logged on to the host operating system and activating, for the different user, a different container that is isolated from the host operating system and the container.

6. The method as recited in claim 1, further comprising determining that the application is attempting to access the network resource over an untrusted network interface and, in response to determining that the application is attempting to access the network resource over the untrusted network interface:
   restricting network communications for the application in the host operating system to a virtual private network (VPN) interface;
   allowing the version of the application running in the container to perform network communications over the untrusted network interface; and
   indicating to a network stack of the container that network communications for the container are isolated to the untrusted network interface.

7. The method as recited in claim 1, further comprising intercepting a response to a web proxy prompt for user credentials and inserting one or more user credentials into the response to the web proxy prompt without communicating the one or more user credentials to the container.

8. The method as recited in claim 1, further comprising scanning one or more untrusted network resources that are accessed in the container and using antivirus software in the host operating system to assign one or more risk levels to the one or more untrusted network resources and quarantine, clean, or delete one of the one or more untrusted network resources if the assigned risk level indicates that the untrusted network resource is malicious.

9. The method as recited in claim 1, further comprising monitoring activity associated with the untrusted network resource in the container and updating local policy at the host operating system based on the monitored activity.

10. The method as recited in claim 1, wherein the application is a web application and the untrusted network resource is a web page.

11. The method as recited in claim 1, wherein the container is activated for network resource communications over a first network communication interface, the method further comprising activating a second container for network resource communications over a second network communication interface.

12. The method as recited in claim 1, further comprising:
   detecting that the application is attempting to access an additional network resource;
   activating the container in response to determining that the additional network resource is an untrusted resource; and
   passing the additional network resource to the container thereby allowing the version of the application running in the container to access the additional network resource.

13. The method as recited in claim 1, further comprising detecting an update to the host operating system and, in response to detecting the update to the host operating system, deleting the container and creating a new container that reflects one or more updated binaries of the host operating system.

14. The method as recited in claim 1, wherein determining that the network resource is an untrusted network resource is performed based on one or more of a file type of the network resource, a network location associated with the network resource, an application type that is attempting to access the network resource, anti-virus scanning of the network resource, or based on consulting a cloud-based service that maintains a list of malicious network resources.

15. The method as recited in claim 1, wherein the container is activated for a user that is logged on to the host operating system, the method further comprising activating one or more additional containers for the user and preventing other users of the host operating system from accessing the container and the one or more additional containers.

16. The method as recited in claim 1, further comprising receiving a request from the version of the application running in the container for user credentials and providing a pseudo-authentication to the version of the application running in the container that includes information proving ownership of the user credentials without providing the user credentials to the container.

17. The method as recited in claim 1, further comprising identifying a local network and emulating the local network for the container.

18. The method as recited in claim 1, further comprising identifying a local network and emulating the local network behind a network address translator (NAT) for the container.

19. The method as recited in claim 1, further comprising scanning for and sharing Domain Name System (DNS) and HyperText Transfer Protocol (HTTP) information between the host operating system and the container.

20. The method as recited in claim 1, further comprising tracking one or more configuration changes performed by the version of the application running in the container.

21. The method as recited in claim 1, further comprising obtaining telemetry from the container and analyzing container activity based on the obtained telemetry.

22. The method as recited in claim 1, further comprising implementing a policy engine that is configured to compute policy for the container based on monitored activity within the container, the computed policy being based on one or more policy templates or policy signatures.

23. The method of claim 1, further comprising:
   detecting that a user of the host operating system has logged off; and
   suspending the container in response to detecting that the user has logged off.

24. A device comprising:
   one or more processors; and
   one or more computer-readable storage media storing computer-readable instructions that are executable by the one or more processors to perform operations comprising:

detecting that a web application that is running on a host operating system is attempting to access to a network resource that is accessible to the device via a network;

in response to detecting that the web application is attempting to access the network resource, determining whether the network resource is an untrusted network resource by comparing the network resource to a policy received from a management and monitoring service that is located remotely from the device;

in response to determining that the network resource is an untrusted network resource:

activating a container that is isolated from the host operating system, the container being configured to run a version of the web application;

passing the untrusted network resource to the container thereby allowing the version of the web application running in the container to access the untrusted network resource;

passing an additional untrusted network resource to the container thereby allowing the version of the web application running in the container to access the additional untrusted network resource; and preventing the version of the web application running in the container from accessing a trusted network resource; and in response to determining that access to the untrusted and additional untrusted network resources has ended, suspending the container.

25. The device as recited in claim 24, the operations further comprising receiving a request from the version of the web application running in the container for credentials and providing a pseudo-authentication to the version of the web application running in the container that includes information proving ownership of the user credentials without providing the user credentials to the container.

26. A device comprising:

one or more processors; and one or more computer-readable storage media storing computer-readable instructions that are executable by the one or more processors to perform operations comprising:

detecting that an application that is running on a host operating system is attempting to access a network resource that is accessible to the device via a network;

in response to detecting that the application is attempting to access the network resource, determining whether the network resource is an untrusted network resource;

in response to determining that the network resource is an untrusted network resource:

activating a container that is isolated from the host operating system, the container being configured to run a version of the application; and passing the untrusted network resource to the container thereby allowing the version of the application running in the container to access the untrusted network; and in response to determining that access to the untrusted network resource has ended, suspending the container.

27. A computer program product comprising a storage device having computer-readable instructions recorded thereon that, when executed by a processor, cause the processor to perform operations that include:

detecting that an application that is running on a host operating system is attempting to access a network resource that is accessible to the device via a network;

in response to detecting that the application is attempting to access the network resource, determining whether the network resource is an untrusted network resource;

in response to determining that the network resource is an untrusted network resource:

activating a container that is isolated from the host operating system, the container being configured to run a version of the application; and passing the untrusted network resource to the container thereby allowing the version of the application running in the container to access the untrusted network resource; and in response to determining that access to the untrusted network resource has ended, suspending the container.

* * * * *